US012802088B2

(12) United States Patent
Subramanian

(10) Patent No.: US 12,802,088 B2
(45) Date of Patent: *Nov. 17, 2026

(54) BRAND-FOCUSED SECURITY ADMINISTRATOR ENGINE IN AN ITEM LISTING SYSTEM

(71) Applicant: eBay Inc., San Jose, CA (US)

(72) Inventor: Jayashree Subramanian, Draper, UT (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/749,602

(22) Filed: Jun. 20, 2024

(65) Prior Publication Data

US 2025/0390894 A1 Dec. 25, 2025

(51) Int. Cl.
*G06Q 30/018* (2023.01)
*G06Q 50/18* (2012.01)

(52) U.S. Cl.
CPC ....... *G06Q 30/0185* (2013.01); *G06Q 50/184* (2013.01)

(58) Field of Classification Search
CPC ............... G06Q 30/015; G06Q 30/018; G06Q 30/0185; G06Q 30/02; G06Q 30/0222;
(Continued)

(56) References Cited

U.S. PATENT DOCUMENTS

| | | | |
|---|---|---|---|
| 8,010,410 | B2 | 8/2011 | Sundaresan et al. |
| 8,234,179 | B2 | 7/2012 | Sundaresan et al. |

(Continued)

FOREIGN PATENT DOCUMENTS

| | | | | |
|---|---|---|---|---|
| CN | 111199439 A | | 5/2020 | |
| CN | 114863230 | * | 8/2022 | ......... G06Q 30/0185 |

(Continued)

OTHER PUBLICATIONS

Gunawardhana et al., Effectiveness of Machine Learning Algorithms on Battling Counterfeit Items in E-commerce Marketplaces, IEEE 2023 Int'l Research Conference on Smart Computing and Systems Engineering (SCSE), vol. 6, pp. 1-7 (Year: 2023).*

(Continued)

*Primary Examiner* — Michael P Harrington
*Assistant Examiner* — Mark C Clare
(74) *Attorney, Agent, or Firm* — Shook Hardy & Bacon L.L.P.

(57) ABSTRACT

Methods, systems, and computer storage media for providing brand-focused security administration in an item listing system are described. Using a brand-focused machine learning model, the brand-focused security administrator engine supports generating different comprehensive reports and analytics on brand-related security metrics, including brand compliance rates, infringement incidents, enforcement actions taken, and overall item listing system integrity. The brand-focused security administrator engine also supports visualizing the brand-focused security analytics results data in a manner that enhances usability and decision-making by presenting complex brand-focused security analytics results data in a clear, actionable format. In operation, brand-focused security data is accessed. The brand-focused security data is analyzed using a brand-focused machine learning model that is trained based on a multi-dimensional authenticity analysis dataset. Brand-focused security analytics results data is generated. The brand-focused security analytics results data is communicated to cause display of one or more visualizations based on the brand-focused security analytics results data.

20 Claims, 24 Drawing Sheets

(58) Field of Classification Search
CPC ........... G06Q 30/0241; G06Q 30/0601; G06Q 50/184
USPC .................................................. 705/310, 318
See application file for complete search history.

(56) References Cited

U.S. PATENT DOCUMENTS

| | | | | |
|---|---|---|---|---|
| 9,311,644 | B2 | 4/2016 | Liu et al. | |
| 9,996,590 | B2 | 6/2018 | Wang et al. | |
| 11,176,589 | B2 | 11/2021 | Pyati | |
| 11,676,187 | B2 | 6/2023 | Mozzami et al. | |
| 11,861,528 | B1 | 1/2024 | Brager et al. | |
| 2014/0279243 | A1 | 9/2014 | Kukal et al. | |
| 2016/0253679 | A1* | 9/2016 | Venkatraman | G06Q 30/0185 705/310 |
| 2017/0186032 | A1 | 6/2017 | Rangasamy et al. | |
| 2017/0206574 | A1* | 7/2017 | Sharma | G06Q 20/4016 |
| 2019/0354744 | A1 | 11/2019 | Chaloux et al. | |
| 2021/0248624 | A1* | 8/2021 | Keren | G06Q 50/184 |
| 2021/0264442 | A1 | 8/2021 | Kim et al. | |
| 2021/0304121 | A1 | 9/2021 | Lee et al. | |
| 2022/0139041 | A1 | 5/2022 | Li et al. | |
| 2022/0358571 | A1 | 11/2022 | Gabale et al. | |
| 2023/0162253 | A1 | 5/2023 | Raghavan et al. | |
| 2023/0222775 | A1 | 7/2023 | Stonehouse | |
| 2024/0037497 | A1 | 2/2024 | Brown et al. | |
| 2024/0185079 | A1* | 6/2024 | Singh | G06N 3/08 |
| 2025/0022027 | A1 | 1/2025 | Sipe et al. | |
| 2025/0173518 | A1 | 5/2025 | Qiang et al. | |

FOREIGN PATENT DOCUMENTS

| | | | | |
|---|---|---|---|---|
| CN | 117151826 A | | 12/2023 | |
| WO | 2022/108886 A1 | | 5/2022 | |
| WO | WO 2024173092 | * | 8/2024 | G01N 21/951 |

OTHER PUBLICATIONS

Fuchs et al., "Intent-Driven Similarity in E-Commerce Listings", CIKM '20: Proceedings of the 29th ACM International Conference on Information & Knowledge Management, Oct. 2020, 8 pages.

Goumy et al., "Ecommerce Product Title Classification", Available online at: < https://ceur-ws.org/Vol-2319/ecom18DC_paper_5.pdf>, Jul. 2018, 4 pages.

Jahanshahia et al., "Text Classification for Predicting Multi-level Product Categories", Available online at: https://arxiv.org/pdf/2109.01084>, Sep. 2, 2021, 34 pages.

Extended European Search Report received for European Patent Application No. 25182952.9, mailed on Oct. 2, 2025, 12 pages.

Non-Final Office Action received for U.S. Appl. No. 18/749,596, mailed on Aug. 11, 2025, 23 pages.

Non-Final Office Action received for U.S. Appl. No. 18/749,600, mailed on Oct. 1, 2025, 13 pages.

Zhang et al. "Automatic Generation of Pattern-controlled Product Description in E-commerce", Conference: The World Wide Web Conference, May 2019, pp. 2355-2365.

Extended European Search Report received for European Patent Application No. 25182920.6, mailed on Oct. 2, 2025, 12 pages.

Extended European Search Report received for European Patent Application No. 25183020.4, mailed on Oct. 2, 2025, 12 pages.

Final Office Action received for U.S. Appl. No. 18/749,596, mailed on Jan. 28, 2026, 36 pages.

Notice of Allowance received for U.S. Appl. No. 18/749,600, mailed on Apr. 24, 2026, 12 pages.

* cited by examiner

BRAND-FOCUSED SECURITY ADMINISTRATOR ENGINE IN AN ITEM LISTING SYSTEM

BACKGROUND

Users utilize item listing systems for browsing product listings, making purchases, and sometimes selling items. When sellers list items, especially brand-named items, they must adhere to guidelines set by the platform and ensure the authenticity and accuracy of their listings. For users buying items, brand-named items often carry a reputation for quality and authenticity, influencing purchasing decisions. However, if counterfeit or misrepresented items are listed, it can harm the trust between buyers and the item listing system. In this context, an item listing provider enforces policies to prevent fraudulent listings, protect brand integrity, and maintain a positive user experience to uphold its reputation and legal obligations. For example, brand security tools can include trademark monitoring, anti-counterfeiting measures, digital brand protection, intellectual property enforcement, and market surveillance.

SUMMARY

Various aspects of the technology described herein are generally directed to systems, methods, and computer storage media for, among other things providing brand-focused artificial intelligence management using a brand-focused artificial intelligence system associated with an item listing system. The brand-focused artificial intelligence system provides brand-focused artificial intelligence functionality to support different applications and services in the item listing system. The brand-focused artificial intelligence system includes a brand-focused machine learning model training engine, a brand-focused security administrator engine, and a brand-focused listing management engine. In this way, the brand-focused artificial intelligence system supports the item listing system by automating brand-related tasks such as machine learning training; security administration and analytics; and item listing quality enforcement.

The brand-focused machine learning model training engine supports training a brand-focused machine learning model that predicts brands for item listings that do not include brand information. Model training includes brand data processing, model selection, and optimization algorithms. In particular, brand-focused machine learning model training is a process of teaching a machine learning model-using a multi-dimensional authenticity analysis dataset—to recognize patterns and make predictions or decisions based on input data. The training can be based on novel training techniques and training features from data associated with the multi-dimensional authenticity analysis dataset (i.e., brand protection and verification data and item listing system data) to cause generation of a brand-focused machine learning model. For example, the training is based on brand protection and verification data (e.g., Verified Rights Owners—VeRO data and Post Sale Authentication—PSA data) and item listing system data (e.g., item listings text and/or images) that support identifying highly relevant brand features for machine learning to support brand prediction for item listings.

The brand-focused machine learning model can be multimodal model that includes a text-based model and an image recognition model that can be selectively implemented to support functionality (e.g., applications in the item listing system). The brand-focused machine learning model can be deployed to operate with applications and services associated the brand-focused security administrator engine and the brand-focused listing management engine.

The brand-focused security administrator engine supports generating comprehensive reports and analytics on brand-related security metrics, including brand compliance rates, infringement incidents, enforcement actions taken, and overall item listing system integrity. The brand-focused security administrator engine also supports visualizing the brand-focused security analytics results data in a manner that enhances usability and decision-making by presenting complex brand-focused security analytics results data in a clear, actionable format.

The brand-focused listing management engine supports listing accuracy compliance with the item listing marketplace standards, and optimization of search visibility and customer experience. The brand-focused listing management engine also supports identifying deliberate bypassing or violating of the item listing system's guidelines for product listings and employs corrective actions to improve listing quality. Moreover, the brand-focused listing management engine enhances customer satisfaction by driving higher CSAT scores through improvements; reduces instances of poor purchasing experiences, thereby minimizing potential losses and attracting more customers to the item listing platform; and facilitates the growth of Gross Merchandise Value within the Item listings system platform.

In this way, the brand-focused machine learning model training engine trains and deploys a brand-focused machine learning model; the brand-focused security administrator tool leverages the novel brand-focused machine learning model to provide novel functionality associated with brand monitoring and detection, dashboards, real-time alerts and notification, and trend analysis charts; and the brand-focused listing management tool leverages the novel brand-focused machine learning model to provide novel functionality associated with listing management including seller listing flow and optimizing visibility based on listing quality signals.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION OF THE INVENTION

Overview

Figure 1A:
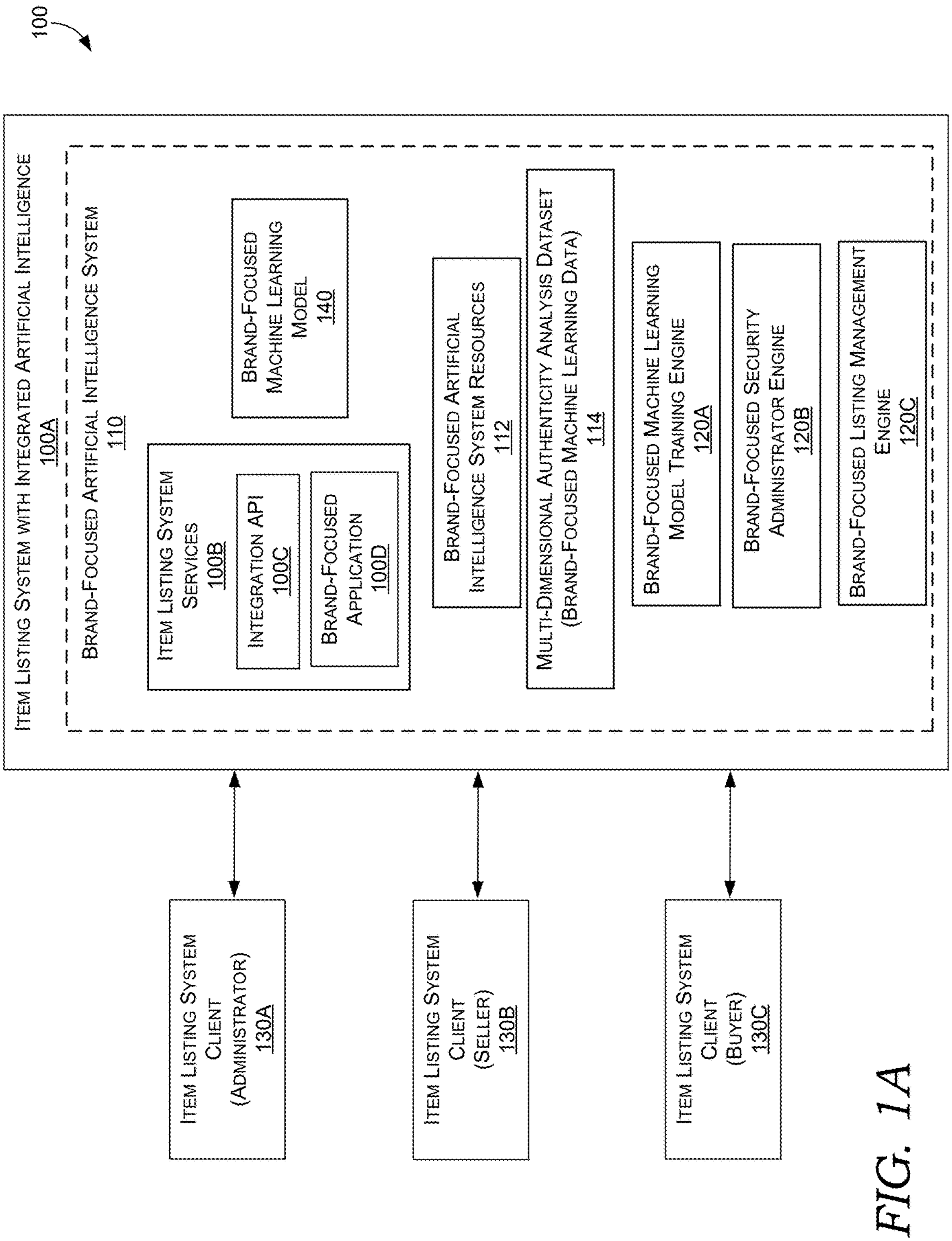
FIGS. 1A and 1B are block diagrams of a brand-focused artificial intelligence system for providing brand-focused artificial intelligence system management in an item listing system, in accordance with aspects of the technology described herein.

An item listing system and/or platform supports storing items (products or assets) in item databases and providing a search system for receiving queries and identifying search result items based on the queries. An item (e.g., physical item or digital item) refers to a product or asset that is provided for listing on an item listing platform. Search systems support identifying, for received queries, result items from item databases. Item databases can specifically be for content platform or item listing platforms such as EBAY content platform, developed by EBAY INC., of San Jose, California. An item listing system may also provide AI-supported applications ("AI applications") that leverage AI models (e.g., Natural Language Processing models—NLP and image recognition models) to perform computing tasks. Applications use AI to perform various tasks across different domains including product recommendation, search optimization, sentiment analysis, product categorization, customer support, and spam and fraud detection.

In the fast-paced world of e-commerce, ensuring that product listings are complete and accurate is important for sellers, buyers, and providers of an e-commerce platform. By way of illustration, Jane, a seasoned online seller, is preparing to list a new set of wireless earbuds on her preferred item listing platform. However, in her haste, she neglects to fill in the "brand" field before submitting the listing. This seemingly minor oversight can lead to a cascade of technical and user experience issues that can impact everything from search functionality to customer trust. When brand information is omitted from item listings on an item listing platform, it creates significant technical challenges in combating counterfeiting. Automated detection systems struggle to verify product authenticity without brand data, while manual reviews become more labor-intensive and prone to errors. Incomplete brand information hampers trend analysis and reporting, leading to gaps in data that skew insights into counterfeiting activities. This lack of data undermines user trust, complicates compliance with legal regulations, and diminishes the effectiveness of user reporting mechanisms. To address these issues, platforms must enforce mandatory brand fields, enhance verification processes, educate sellers, and collaborate closely with brands.

An item listing system provider enforces policies to prevent fraudulent listings, protect brand integrity, and maintain a positive user experience to uphold its reputation and legal obligations. Brand security can refer to measures taken to protect a brand's identity, reputation, and intellectual property rights within the online marketplace. It involves safeguarding against various threats, including counterfeiting, unauthorized reselling, trademark infringement, brand impersonation, and brand dilution. Brand security can include trademark protection, counterfeit prevention, authorized seller management, brand monitoring, brand identity protection, cybersecurity, and legal enforcement.

Conventionally, item listing systems are not configured with a comprehensive logic and infrastructure to effectively provide brand-focused artificial intelligence functionality for an item listing system. These systems fail to provide machine learning model training, security administrator tools, and listing management tools that adequately leverage artificial intelligence to provide brand-focused security.

Item listing systems lack machine learning engines, techniques, and data to sufficiently train a machine learning model to effectively and comprehensively support an item listing system. Machine learning model training may be based on limited and biased data, thus the model fails to generalize adequately to a diverse range of brands. Moreover, without adequate contextual understanding (e.g., understanding brand based on knowledge of industry, market trends, and seller and buyer behavior), a trained model may misinterpret brand-related signals or fail to capture subtle brand associations.

Item listing systems further lack adequately trained machine learning models that support providing brand-focused security. For example, brand security refers to measures taken to protect a brand's identity, reputation, and intellectual property rights within an item listing system. An item listing system may collect data based on item categories and other data that focus on brand-related features. However, without appropriate brand security data, brand monitoring tools, security administrators are not able to visualize and identify fraudulent trends to safeguard the security of brands associated with the item listing system.

Item listing systems also often lack sufficiently trained machine learning models to effectively support item listing functionalities and features. For instance, an item listing platform may encounter challenges in balancing the tradeoffs between a seamless user experience and accurate listing information. On one hand, there may be an inclination towards requiring users to input all necessary data during the listing process, while on the other hand, there could be a desire to streamline the seller listing flow without the requirement to input all item listing information. Moreover, the absence of a brand-focused machine learning model may limit the ability to identify fraudulent listings and mitigate the impact of fraudulent listings on the item listing system.

Thus, conventional item listing systems can be improved by addressing these limitations based on leveraging advanced machine learning models and techniques and item listing system tools—that can enhance the machine learning functionality for protecting brands in an item listing system. As such, a more comprehensive item listing system—with an alternative basis for performing brand-focused artificial intelligence management—can improve computing operations and interfaces for providing brand protection in an item listing system.

Embodiments of the present invention are directed to systems, methods, and computer storage media for, among other things, providing brand-focused artificial intelligence management using a brand-focused artificial intelligence system associated with an item listing system. The brand-focused artificial intelligence system provides brand-focused artificial intelligence functionality to support different applications and services in the item listing system. The brand-focused artificial intelligence system includes a brand-focused machine learning model training engine, a brand-focused security administrator engine, and a brand-focused listing management engine.

DESCRIPTION OF TECHNICAL SOLUTION

At a high level, an item listing system provider enforces brand security policies within the platform. To streamline the item listing process, the item listing system may allow sellers to leave certain fields, including the brand field, empty. This omission can occur either intentionally or unintentionally. When the brand field is left blank, the system must employ various techniques, such as natural language processing, image recognition, or database cross-referencing, to infer the brand of the item.

The absence of a specified brand can significantly impede the provider's ability to enforce brand security protocols. For instance, implementing brand-specific security measures becomes challenging without explicit brand identification. Furthermore, malicious sellers may deliberately omit the brand information to circumvent security policies designed to protect specific brands. This vulnerability necessitates robust mechanisms for brand inference and verification to maintain the integrity and security of the item listing system.

A brand-focused artificial intelligence system provides a machine learning engine for training a machine learning model that can predict brands for item listings that do not include brand information. The machine learning training engine is a software system or framework designed to facilitate the process of training machine learning models. It typically includes functionalities for data preprocessing, model selection, hyper-parameter tuning, and optimization algorithms to iteratively improve the model's performance based on a given dataset.

The machine learning model is trained on different data sources (e.g., item listing system data; Verified Rights Owners—VeRO data and Post Sale Authentication—PSA data) and further trained to employ item listing information (i.e., indicators) for an item listing (e.g., title, category, listing site, and images) to make a prediction of what the brand of the item listing should be. The machine learning model is trained using algorithms (e.g., word embedding algorithms and image recognition algorithms) to generate text and/or image-based machine learning models that support predicting brands. Importantly, the machine learning is trained on a multi-dimensional authenticity analysis dataset—having specific training data (i.e., verification and authentication data and historical item listing system data) used to train the brand-focused machine learning model. In this way, based on input for an item listing that is missing brand information, a predicted brand can be identified.

Predicting missing brand information can significantly enhance the ability to measure and combat counterfeit rates, as well as improve the accuracy of detecting counterfeits (catches) and identifying false negatives (misses). Enhancing counterfeit detection can be based on improved algorithm accuracy. Predicting and filling in missing brand information improves the quality of data used to train machine learning algorithms, leading to more accurate detection of counterfeit products. Having brand information ensures that data patterns remain consistent, making it easier for algorithms to identify anomalies that may indicate counterfeit goods.

Better cross-referencing is possible as predicted brand information allows listings to be cross-referenced with existing databases of authentic products and known counterfeits, enhancing the identification process. With brand data, systems can filter and flag suspicious listings more effectively, increasing the chances of catching counterfeits. Measuring counterfeit rates can be based on accurate metrics for brands (e.g., BRAND A or BRAND B) and not simply categories (e.g., handbags or shoes). Predicting missing brand information creates more complete data sets, which provide more accurate metrics on the prevalence of counterfeit products. Improved data allows for more reliable trend analysis, helping to identify patterns in counterfeiting activities over time. Comparative analysis can also be performed by comparing counterfeit detection rates before and after implementing brand prediction, and platforms can measure the improvement in identifying counterfeit products. With accurate brand data, platforms can generate brand-specific counterfeit rates, providing valuable insights to both platform administrators and brand owners.

Moreover, identifying catches and misses can be improved as predicting missing brand information reduces the number of reports by third parties or outside entities (misses) by enabling algorithms to catch more instances of counterfeit products. Improved data quality gives more confidence in detection results, ensuring that fewer counterfeit items slip through undetected. Better performance tracking is possible as the item listing platform can better track the performance of their detection systems by comparing the rates of caught counterfeits (catches) to the rates of missed ones, using the predicted brand information to refine their metrics. Detailed analysis of catches and misses allows for continuous improvement of detection algorithms, making them more effective over time.

In addition, predicting missing brand information significantly enhances the quality of item listings in multiple ways. Firstly, it improves searchability and discoverability by allowing products to appear in brand-specific searches and filters, enhancing the overall search experience and potentially increasing sales. Secondly, complete listings with brand information build user trust and confidence, leading to higher customer satisfaction and fewer returns or disputes. Thirdly, including brand information ensures consistency across all listings, making the platform appear more professional and user-friendly. Fourthly, accurate brand information improves recommendation algorithms, enhancing the personalization of the shopping experience and increasing user engagement.

Additionally, complete brand information enables the generation of more accurate analytics and insights, providing valuable data for both the platform and sellers to refine their strategies. Furthermore, predicting brand information aids in the detection of counterfeit items, reducing the risk of fraudulent listings and enhancing the platform's reputation for hosting genuine products. Lastly, accurate brand information ensures compliance with legal and regulatory requirements, helping the platform avoid legal issues and maintain its integrity. Overall, by predicting and filling in missing brand information, the item listing system can significantly elevate the quality of item listings, resulting in a better user experience, increased trust among buyers, and enhanced performance and reputation of the platform.

By way of illustration, the brand-focused machine learning model may include one or more machine learning models. The brand-focused machine learning model can be a word embedding model or text classification model. A specific word embedding machine learning algorithm can be leveraged as a specific implementation within the broader category of word embedding and text classification models, which also includes other models like FastText, Word2Vec and GloVe. The machine learning algorithm can be a tool for natural language processing tasks, especially when dealing with large vocabularies, morphologically rich languages, or when computational efficiency is a concern. The word embedding and text classification models are designed to convert words and text into numerical vectors that capture semantic meaning, facilitating various natural language processing tasks. For example, the machine learning algorithm can be Word2Vec model that further includes capabilities to handle sub-word information, which is particularly useful for morphologically rich languages and for dealing with out-of-vocabulary words.

The brand-focused machine learning model can be or include an image recognition model. An image recognition model can be based on deep convolutional neural network (CNN) designed to facilitate the training of very deep networks by addressing the problem of vanishing gradients. For example, ResNet is a deep convolutional neural network (CNN) that excels in image classification and object detection tasks. It introduces the concept of residual learning through shortcut connections that allow gradients to flow more easily through the network layers, making it possible to train networks with hundreds or even thousands of layers effectively. ResNet's architecture typically consists of multiple residual blocks, where each block contains a few convolutional layers and a shortcut connection that bypasses one or more of these layers, summing the input directly to the output. This approach helps maintain performance and accuracy even as the network depth increases significantly.

By using an image recognition model along with a word embedding model, the brand-focused machine learning model—as a multi-modal model—can process and analyze both textual and visual data, enhancing its ability to automatically identify brands. The brand-focused machine learning model can combine text classification functionality with image recognition functionality, forming a multi-modal or multi-input model. This approach enables the model to process and extract features from both textual descriptions and associated images simultaneously. The brand-focused machine learning model could analyze product descriptions and images to provide a comprehensive understanding of listed items. For instance, the text classification part of the model might use natural language processing (NLP) techniques to categorize products or analyze customer sentiment, while the image recognition component could employ computer vision techniques to perform tasks like object detection or brand logo recognition. By integrating both text and image processing capabilities, the model can capitalize on the unique information offered by each modality, enhancing its ability to make accurate predictions or classifications. This fusion of modalities enables more nuanced insights, such as identifying the brand associated with a product listing by leveraging information from both the textual description and the accompanying image.

The brand-focused machine learning model is trained using multi-dimensional authenticity analysis dataset (i.e., item listing system data, VeRO data, and PSA data "brand protection and verification data"). The multi-dimensional authenticity analysis dataset, as training data, refers to a comprehensive collection of diverse and interconnected information sources used to train machine learning. This dataset integrates various dimensions related to brand authenticity, legitimacy, and integrity, drawing from multiple data sources such as item listing data and brand protection and verification data. It includes rich data sources encompassing product descriptions, images, seller information, customer feedback, trademark registrations, copyright filings, and legal documentation. Each dimension within the dataset is represented by a set of features extracted from relevant data sources, including textual, visual, numerical, and contextual features.

VeRO (Verified Rights Owner) data refers to information provided by rights owners to online marketplaces to help protect their intellectual property rights. Rights owners, such as trademark or copyright holders, submit VeRO reports to inform the marketplace of listings that infringe upon their intellectual property rights. When a rights owner identifies a listing that violates their intellectual property rights, they can submit a VeRO report to the online marketplace. This report includes details of the infringement, such as the specific listing URL, the type of infringement (e.g., trademark infringement, copyright violation), and evidence supporting the claim. Once the marketplace receives a VeRO report, they review the information provided and may take actions such as removing the infringing listing, contacting the seller to resolve the issue, or even suspending the seller's account if repeated violations occur. VeRO data helps online marketplaces maintain the integrity of their platforms by addressing intellectual property infringement and ensuring a fair and safe environment for both buyers and legitimate sellers.

Post Sale Authentication data refers to the information and verification records collected after a transaction is completed to confirm the authenticity of a purchased item, particularly relevant in e-commerce platforms selling high-value, branded, or luxury items. This data includes transaction details, physical inspection reports by experts, authentication certificates from recognized authorities, buyer feedback and claims, tracking and shipping records, return and refund data, and historical sales data of similar items. It ensures that the item delivered to the buyer is genuine and matches the seller's description, maintaining trust and credibility in the marketplace. By authenticating items post-sale, platforms protect buyers from counterfeit products, enhance buyer satisfaction, and uphold marketplace integrity.

VeRO (Verified Rights Owner) data, Post Sale Authentication data, and item listing system data can be invaluable for training a machine learning model to predict brands in item listings that lack brand information. The machine learning model may predict a brand and further provide metadata (e.g., brand features) of VeRO data, PSA data, and item listing system data associated with predicting the brand and any related brand security and item listing information. VeRO data includes verified brand information, trademarks, and rights ownership details, serving as a ground truth for brand identification. Post Sale Authentication data encompasses transaction details, physical inspection reports, authentication certificates, buyer feedback, tracking and shipping records, return and refund data, and historical sales data, providing a comprehensive view of item authenticity and brand characteristics. Item listing system data also includes transaction details, seller data, buyer feedback, tracking and shipping records, return and refund data, and historical sales data.

From VeRO data, features such as brand names, logos, associated trademarks, product descriptions, categories, and legal documentation can be extracted. PSA data offers features from transaction records, inspection reports, customer feedback, and historical sales data, enabling a holistic view of brand characteristics. Item listing system data can include item title, item description, images, listing site, price, category and department. By combining textual features (e.g., item descriptions, customer reviews) with visual features (e.g., item images, logos) and incorporating transactional and historical sales data, a robust feature set for training the model is created.

Convolutional Neural Networks (CNNs) are particularly effective for extracting high-level features from images, such as logo patterns, product design elements, and color schemes. Transactional data from PSA records includes details about seller identities, sales volumes, pricing trends, and buyer feedback. This data is transformed into numerical features representing patterns of transactions, historical sales trends, and customer satisfaction levels. VeRO data provides verified brand names, trademarks, and legal ownership information. Features extracted from this data include brand ownership history, trademark registration details, and previous infringement reports, which are critical for understanding brand authenticity and legal compliance. Contextual information, such as geographical data, temporal trends, and user behavior patterns, can be integrated to provide additional insights into the authenticity and market presence of brands. For example, geographical data might reveal regional popularity of certain brands, while temporal data could indicate seasonal trends in brand sales.

VeRO data, PSA data, and item listing system data are employed in training a machine learning model to predict brands in item listings that lack brand information. VeRO data serves as a verified source of brand information, ensuring that the model is trained on accurate and legally recognized brand details. This data acts as ground truth for model training, enhancing the reliability and credibility of brand predictions. PSA data provides detailed insights into the post-transaction verification process, including physical inspections and customer feedback. This information is ensures identifying counterfeit products and verifying the authenticity of brand listings, making it an essential component of the feature set. Item listing system data includes the structured information maintained by an e-commerce platform or any similar online marketplace about the products available for sale. This data includes various attributes and details about each item listed on the platform, facilitating search, discovery, and purchasing by customers.

Combining VeRO, PSA data, and the item listing system data introduces a rich variety of features, encompassing textual, visual, and transactional dimensions. This diversity allows the model to capture different aspects of brand characteristics, from legal trademarks to customer perceptions and sales patterns. The integration of visual features from product images (enabled by PSA data) with textual and legal features from VeRO data allows the model to more effectively detect counterfeit items. For example, discrepancies between visual logos and textual brand descriptions can signal potential fraud. PSA data adds contextual layers such as transaction histories and buyer behavior, which help the model understand the market context of brands. This contextual information is vital for making accurate brand predictions, especially in cases where brand names are missing or unclear. In this way, the model may predict a brand and further provide metadata (e.g., brand features) of VeRO data, PSA data, and item listing system data associated with predicting the brand and any related brand security and item listing information.

Machine learning algorithms like natural language processing techniques for text analysis, convolutional neural networks for image recognition, and supervised or semi-supervised learning for integrating these features can be employed to predict missing brand information. The dataset incorporates ground truth labeling and annotations derived from brand protection and verification data and expert judgments to provide reference points for authenticity assessment and model training. It evolves over time to adapt to changes in marketplace dynamics, legal regulations, and brand-related activities, incorporating real-time updates and historical data to capture temporal trends and longitudinal patterns of brand authenticity. Scalable and flexible, the dataset accommodates new data sources, features, and dimensions as needed, supporting a wide range of machine learning algorithms and analytical techniques for authenticity analysis and brand security. Overall, the multi-dimensional authenticity analysis dataset serves as a comprehensive and versatile resource for training machine learning models, facilitating effective brand prediction and detection and prevention of counterfeit, infringing, or misrepresented brand listings.

A multi-dimensional authenticity analysis dataset can significantly enhance the training of a machine learning model to predict brands in item listings missing brand information by leveraging its rich and diverse data sources and features. The multi-dimensional authenticity analysis dataset integrates various data sources, including item listing data (e.g., product descriptions, images, seller information) and brand protection and verification data (e.g., trademark registrations, legal documents). This diverse dataset provides a comprehensive view of brand characteristics and associations.

From the integrated dataset, relevant features are extracted to represent different aspects of brands. For instance: textual features, extracting keywords, phrases, and semantic patterns from product descriptions, reviews, and legal documents; visual features, analyzing product images and logos to identify visual patterns associated with specific brands; contextual features, utilizing seller information, geographic data, and temporal trends to understand the context in which brands appear.

Feature fusion can be employed to these diverse features into a unified representation through feature fusion techniques. This can involve concatenation, weighted sums, or advanced methods like attention mechanisms to ensure the model can leverage the complementary information effectively. Feature fusion in machine learning involves combining features from multiple data sources to create a more comprehensive and informative representation for model training. In the context of predicting brands in item listings that lack brand information, feature fusion enables the integration of diverse data types, such as textual, visual, and transactional features, to enhance the model's accuracy and robustness. Textual data from item listings, including product titles, descriptions, and customer reviews, can be processed using Natural Language Processing (NLP) techniques. These methods, such as TF-IDF (Term Frequency-Inverse Document Frequency), word embeddings (e.g., Word2Vec, GloVe), or advanced language models (e.g., BERT), convert textual information into numerical vectors that capture semantic meaning. Visual data, such as product images and brand logos, are processed using image recognition techniques.

In implementing feature fusion, textual data is cleaned and tokenized, images are preprocessed for input into CNNs, and transactional data is normalized. Legal documents are parsed to extract relevant brand information. NLP techniques are used to extract textual embeddings, CNNs to extract visual embeddings, and statistical methods to extract transactional features. Legal features are encoded based on trademark and ownership details. Features from different sources are then combined into a single feature vector. Techniques such as concatenation, weighted summation, or advanced methods like attention mechanisms can be used to integrate these features. The integrated feature vectors are used to train a machine learning model, such as a neural network or gradient boosting model, generative AI models and LLMs.

By way of context, machine learning—unsupervised learning, transfer learning, generative AI, and large language models—are can be employed in machine learning model training. For example, these techniques enhance the capability to fuse diverse features from multiple data modalities, thereby improving the richness, robustness, and generalizability of machine learning models across various tasks and domains. By leveraging each other's strengths—such as discovering underlying patterns, transferring learned knowledge, generating synthetic data, and understanding complex linguistic contexts—these techniques synergistically contribute to more effective feature fusion and ultimately enhance overall model performance.

Unsupervised machine learning models aim to find patterns and structure in data without explicit supervision or labeled outcomes. They are used for tasks such as clustering (grouping similar data points together) and dimensionality reduction (reducing the number of variables under consideration). In the context of feature fusion, unsupervised learning can be employed to combine features from different sources or modalities into a cohesive representation that captures underlying patterns or relationships in the data.

Transfer learning involves leveraging knowledge gained while solving one problem to help solve a different but related problem. In machine learning, this typically means transferring knowledge from a pre-trained model (often on a large dataset) to a new model for a different task or domain. Transfer learning can facilitate feature fusion by allowing models to incorporate learned features from one domain into another, enhancing the model's ability to generalize and perform well on new tasks.

Generative AI refers to models and techniques that create new data instances that resemble the training data. This includes models like Generative Adversarial Networks (GANs) and Variational Autoencoders (VAEs). In terms of feature fusion, generative AI can synthesize new features or representations that capture complex relationships between original features or across different data modalities, thereby enriching the feature space available for training models.

Large language models are deep learning models trained on vast amounts of text data to understand and generate human language. Examples include models like GPT (Generative Pre-trained Transformer) series. LLMs can be used in feature fusion by extracting semantic features from text or integrating textual information with other types of data (such as images or structured data). This integration can enhance the richness and contextuality of the features used by machine learning models.

In this way, the techniques and feature fusion enable combining information via from multiple sources or modalities to create a unified representation that enhances model performance. Unsupervised learning techniques can help in merging features by discovering patterns and relationships across different data sources. Transfer learning facilitates the integration of features learned from one domain into another, improving the robustness and effectiveness of fused features. Generative AI and LLMs contribute by generating new features or embeddings that capture intricate dependencies and semantics, thereby enriching the feature space for training more powerful machine learning models.

Using the fused features, a machine learning model (such as a neural network, random forest, or support vector machine, generative AI models and LLMs) is trained. The model learns to recognize patterns and associations that are indicative of specific brands, even in the absence of explicit brand information in the item listing. The dataset's ground truth labels from brand protection and verification data and expert annotations provide a reliable basis for supervised learning. The model can compare its predictions against these labels during training, enabling it to adjust and improve its accuracy. The model's performance is evaluated using metrics like accuracy, precision, recall, and F1 score. Based on these evaluations, the model is iteratively refined and retrained to improve its predictive capabilities. Hyperparameter tuning and iterative feature selection are conducted to optimize model performance. By leveraging feature fusion, integrating VeRO data, PSA data, and item listing system data creates a robust, multi-dimensional dataset that significantly enhances the ability of machine learning models to accurately predict brands in item listings. This comprehensive approach ensures that the model can make well-informed predictions based on a wide array of complementary information sources, leading to improved brand security and authenticity verification on e-commerce platforms. Once trained, the model can be deployed to predict the brand for new item listings that lack explicit brand information. This helps in maintaining the integrity and authenticity of brand listings on the platform.

Upon being deployed within the item listing system, the model can automatically predict and fill in missing brand information in item listings, providing suggestions or automatic updates to sellers to ensure brand accuracy. Additionally, the model can flag suspicious listings where the predicted brand does not match the seller's provided information or known brand patterns, enhancing fraud detection and prevention. By leveraging multi-dimensional authenticity analysis dataset, the platform can significantly improve its ability to accurately predict and verify brand information, thereby enhancing the overall quality and trustworthiness of the marketplace.

Consider a scenario in an item listing system where a new item listing is received without explicit brand information. The item listing system utilizes a machine learning model trained on a multi-dimensional authenticity analysis dataset to address this situation.

Upon receiving the item listing, the item listing system processes the listing through the trained machine learning model. The model leverages textual features from the product description, visual features from the product images, and contextual features from the seller information to make a prediction about the missing brand. For instance, if the product description mentions specific attributes or characteristics commonly associated with a particular brand, or if the product image contains recognizable brand logos or trademarks, the model can use this information to infer the most likely brand associated with the item.

Once the missing brand is identified, the platform can take proactive measures to enforce brand security. If the predicted brand aligns with registered trademarks or intellectual property rights data stored in the platform's database (e.g., VeRO data), the listing is approved and labeled with the correct brand information. However, if the predicted brand does not match any known trademarks or if there are discrepancies indicating potential counterfeit or infringing activity, the listing is flagged for further review.

In addition to brand identification and security enforcement, the machine learning model's predictions contribute to improving overall item listing quality. By automatically filling in missing brand information for incomplete listings, the model enhances the completeness and accuracy of product listings on the platform. This improves the user experience for shoppers by providing them with more informative and trustworthy product information. Moreover, by ensuring consistency and compliance with brand information standards, the item listing system fosters trust among sellers and buyers, leading to increased user satisfaction and engagement. This ensures that only genuine brand listings are allowed on the item listing system, thereby upholding brand security and protecting brand owners' rights.

Advantageously, the embodiments of the present technical solution support providing brand-focused artificial intelligence management using a brand-focused artificial intelligence system associated with an item listing system. The brand-focused artificial intelligence system provides resources for implementing the brand-focused machine learning model training engine, the brand-focused security administrator engine, and the brand-focused listing management engine. The brand-focused artificial intelligence system operations provide a solution to problems (e.g., limited integration of artificial intelligence in brand protection) in an item listing system. The brand-focused artificial intelligence system components, infrastructure, and ordered combination of steps are an improvement over conventional item listing systems that lack support for brand-focused artificial intelligence system for brand protection functionality.

With regard to brand-focused machine learning model training engine, conventional item listing systems have limited understanding of items (e.g. items or products listed in the item listing system)—especially brand information associated with the item. A brand, particularly in the context of a product, item or service, can refer to a logo or name, which is associated with the entire perception and reputation of a product, service, or company in the minds of consumers. As such, a brand-focused machine learning model is trained on a multi-dimensional authenticity analysis dataset—having specific training data used to train the brand-focused machine learning model. For example, the machine learning model training can be based on metadata and unique identifiers from VeRO data and PSA data, item listing system data for sellers, buyers, text and data. Integration of these categories of data allows for a holistic approach to counterfeit detection and brand authenticity assessment. This comprehensive approach significantly improves the accuracy and reliability of predictions related to counterfeit detection and brand authenticity.

With regard to brand-focused security administrator engine, conventional item listing systems have limited brand-focused security measures, security planning and monitoring, and security visualization tools. As such, a brand-focused machine learning model that is trained on multi-dimensional authenticity analysis dataset is deployed in the item listing system. The brand-focused model machine learning model is integrated into the brand-focused security administrator engine that supports monitoring, analyzing, and enforcing brand security measures. The brand-focused model machine learning model focuses on safeguarding the integrity and authenticity of the brands represented on the item listing system while mitigating risks associated with counterfeit products and unauthorized brand usage. The brand-focused security administrator engine generates comprehensive reports and analytics on brand-related security metrics, including brand compliance rates, infringement incidents, enforcement actions taken, and overall item listing system integrity. The brand-focused security administrator engine also supports visualizing the brand-focused security analytics results data in a manner that enhances usability and decision-making by presenting complex brand-focused security analytics results data in a clear, actionable format. In this way, the brand-focused security administrator tool leverages the novel brand-focused machine learning model to provide novel functionality associated with brand monitoring and detection, dashboards, real-time alerts and notification, and trend analysis charts.

With regard to brand-focused item listing management engine, conventional item listing systems have limited item listing functionality that is supported by machine learning functionality-especially a brand-focused machine learning model. As such, a brand-focused machine learning model that is trained on multi-dimensional authenticity analysis dataset is deployed in the item listing system. The brand-focused model machine learning model is integrated into the brand-focused listing management engine that supports listing management functionality including seller listing flow and listing quality signals analysis. The brand-focused listing management engine supports listing accuracy compliance with the item listing marketplace standards, and optimization of search visibility and customer experience. The brand-focused listing management engine also supports identifying deliberate bypassing or violating of the item listing system's guidelines for product listings and employs corrective actions to improve listing quality. In this way, the brand-focused listing management tool leverages the novel brand-focused machine learning model to provide novel functionality associated with listing management including seller listing flow and optimizing visibility based on listing quality signals.

Example System and Resources

Figure 1B:
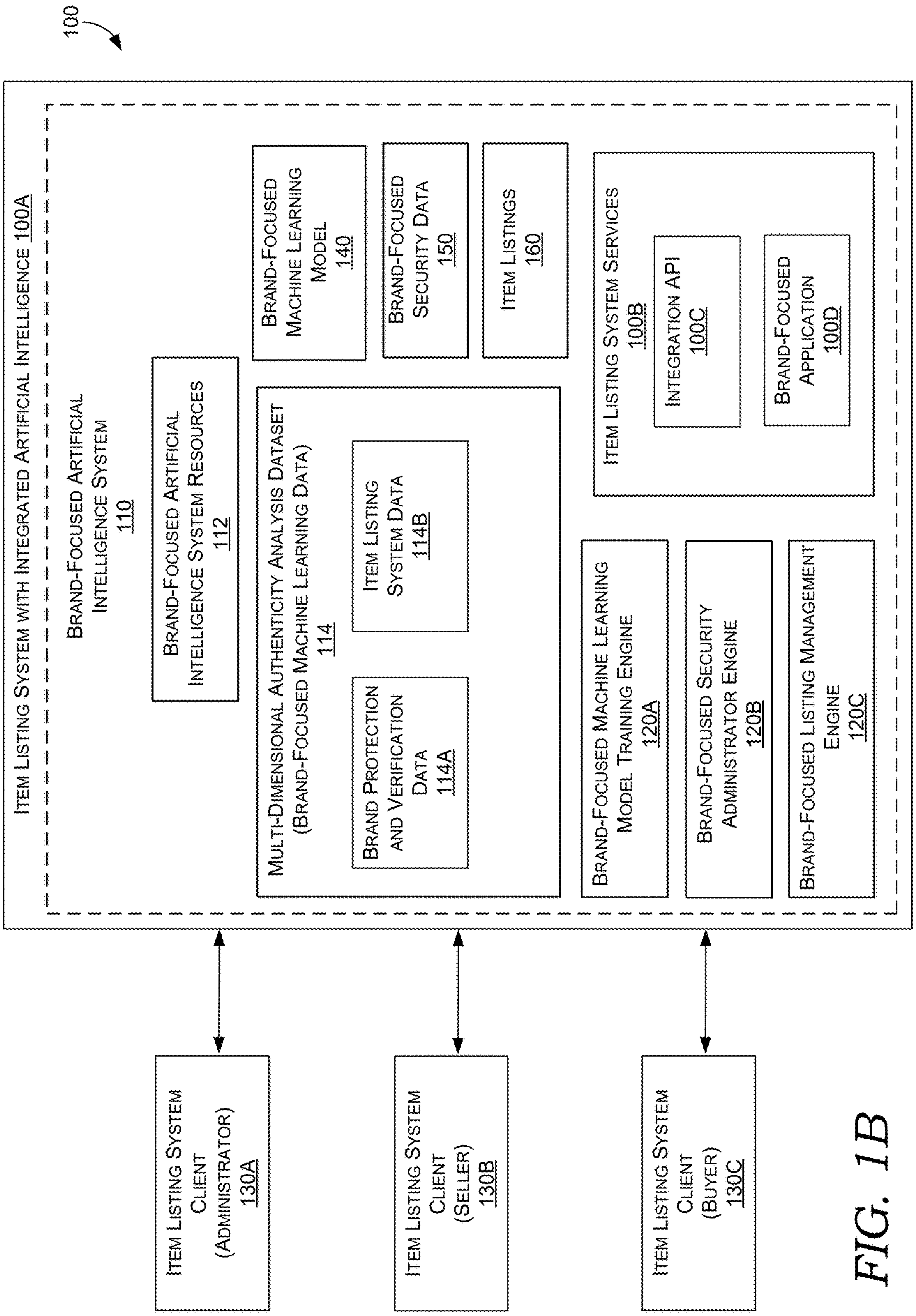

Aspects of the technical solution can be described by way of examples and with reference to FIGS. 1A-1B. FIG. 1A illustrates an item listing system 100 that includes item listing system with integrated artificial intelligence 100A; brand-focused artificial intelligence system 110 including item listing system services 100B with integration API 100C; and brand-focused application 100D; brand-focused artificial intelligence system resources 112; multi-dimensional authenticity analysis dataset 114; brand-focused machine learning model training engine 120A; brand-focused security administrator engine 120B; brand-focused listing management engine 120C; and brand-focused machine learning model 140; item listing system client 130A; item listing system client 130B; and item listing system client 130C.

The item listing system 100 provides a system (e.g., item listing system with integrated artificial intelligence 100A) that includes a system (e.g., brand-focused artificial intelligence system 110) and engines (e.g., brand-focused machine learning model training engine 120A; brand-focused security administrator engine 120B; brand-focused listing management engine 120C) for providing brand-focused artificial intelligence system functionality using resources (e.g., brand-focused artificial intelligence system resources). For example, brand-focused artificial intelligence system resources 112 includes operations, interfaces, and data resources. Operations include brand monitoring, sentiment analysis, product categorization, and fraud detection, ensuring continuous vigilance over brand-related violations, customer sentiment, and fraudulent activities. Interfaces encompass user-friendly dashboards, APIs for seamless integration, and reporting tools for administrators and brand owners to monitor and manage their brand presence efficiently. Data sources include brand protection and verification databases, product listings, customer feedback, and marketplace data, providing comprehensive insights for brand protection strategies, enforcement actions, and market trend analysis. Together, these resources enable safeguarding brand integrity, fostering customer trust, and upholding regulatory compliance within the item listing ecosystem.

The brand-focused artificial intelligence system 110 can further include item listing system services 110B that correspond to different services of the item listing system. The item listing system services can include brand prediction services; brand security services; and listing management services, for example, that employ the brand-focused machine learning model 140 to provide item listing system functionality. Item listing system services 100B can include integration Application Programming Interface (API) 110C that is provided to integrate the item listing system services with the brand-focused machine learning model 140. Brand-focused application 110D may also operate to employ the brand-focused machine learning model 140 to provide functionality associated with the generative AI application 110D. Other variations and combinations of item listing system services are contemplated with embodiments described herein.

The item listing system 100 can further include item listing system clients (e.g., item listing system client 130A—administrator client, item listing system client 130B—seller client, and item listing system client 130C—buyer client). Administrators, tasked with overseeing the item listing system 100 functionality, employ item listing system client 130A to configure and maintain the item listing system 100, setting up categories, attributes, and monitoring user activities to ensure adherence to platform policies. Sellers, integral to the platform's product offerings, utilize the item listing system client 130B to create and manage listings, updating product details, pricing, and inventory levels while processing orders and handling customer inquiries. Interacting through a dedicated dashboard, sellers actively manage their storefronts, adjusting listings and communicating with buyers seamlessly. Buyers, the end-users of the platform, via item listing system client 130C rely on the item listing system 130C to explore, evaluate, and purchase products. They navigate through product listings, filter results, and review detailed information before making purchase decisions, facilitated by the system's intuitive interface. Through interactions with the platform, buyers seamlessly complete transactions, tracking orders and receiving updates throughout the process. Item listing system clients facilitate client-side functionality associated with brand-focused artificial intelligence system 110.

With reference to FIG. 1B, FIG. 1B illustrates item listing system 100 with the components in FIG. 1A and further comprising brand protection and verification data 114A; item listing data 114B; security data 150; and item listing 160.

Brand-Focused Machine Learning Model Training Engine

The brand-focused machine learning model training engine 120A accesses a multi-dimensional authenticity analysis dataset 114 associated with a plurality of brands and trains a brand-focused machine learning model 140 using the multi-dimensional authenticity analysis dataset 114. The multi-dimensional authenticity analysis dataset 114 comprises intellectual property rights enforcement data, authenticated memorabilia data, and item listing system data (e.g., brand protection and verification data 114 and item listing system data 114B) that provide ground truth labeling and annotations associated with model training.

Training the brand-focused machine learning model 140 is based on brand multi-dimensional authenticity features. The brand-focused machine learning model 140 is trained based on machine learning techniques that fuse the brand multi-dimensional authenticity features that correspond to the intellectual property rights enforcement data, the authenticated memorabilia data, and the item listing system data. The brand-focused machine learning model 140 is trained to receive item listing information of an item listing (e.g., item listings 160) without a brand as input for generating a predicted brand, the item listing information operate as indicators with features that are relevant to generating the predicted brand.

The brand-focused machine learning model training engine 120A deploys the brand-focused machine learning model 140 in an item listing system to support one or more applications (e.g., brand-focused application 100D). The one or more applications include a brand-focused security administrator tool and a brand-focused listing management tool. The brand-focused machine learning model 140 is configured to generate a predicted brand for an item listing that does not include a brand, where the predicted brand is generated based on item listing information associated with the item listing. The brand-focused machine learning model 140 is a multi-modal model includes a text-based model and an image recognition model. A first prediction brand score is associated with the text-based model and a second prediction brand score is associated with the image recognition model, such that, a generated predicted brand is based on a combination of the first prediction brand score and the second prediction brand score.

Brand-Focused Security Administrator Engine

The brand-focused security administrator engine 120B accesses brand-focused security data 150. The brand-focused can be item listing that do not include brand information or a combination of item listings with and without brand information. Accessing brand-focused security data is based on a request from a security administrator for brand-focused security analytics results data associated with a brand identifier in the request. The brand identifier is used to indicate that for brand-focused security analytics results data should be generated for the brand identifier.

The brand-focused security administrator engine 120B analyzes the brand-focused security data 1250 using brand-focused machine learning model 140 that is trained based on a multi-dimensional authenticity analysis dataset 114 and brand multi-dimensional authenticity features. The brand-focused machine learning model 140 is integrated into a brand-focused security administrator tool that employs the brand-focused security administer engine 120B of item listing system 100 to support generating the brand-focused security analytics results data.

The brand-focused security administrator engine 120B generates brand-focused security analytics results data. Generating the brand-focused security analytics results data is based on: identifying a predicted brand for an item listing, where the item listing does not include a brand input; extracting item listing information associated with the item listing; and updating existing brand-focused security analytics results data for the predicted brand based on the extracted item listing information.

The brand-focused security administrator engine 120B can also generate a brand security strategy based on the brand-focused security analytics results data. Generating a brand strategy based on brand-focused security analytics involves analyzing data on security incidents, reputation, and customer sentiment. In particular, generating a brand strategy can include identifying threats, assessing brand perception, and defining strategy objectives. The process entails crafting communication plans, implementing security measures, and monitoring performance.

The brand-focused security administrator engine 120B communicates the brand-focused security analytics results data to cause display of one or more visualizations based on the brand-focused security analytics results data. The brand-focused security administrator engine 120B can create security incident trend charts or geospatial incident heat maps. For example, the visualization displays a trend chart showing the frequency and distribution of security incidents over time. Each incident type (e.g., data breach, phishing attack, malware infection) is represented by a different color or symbol on the chart. The x-axis represents time (e.g., days, weeks, months), while the y-axis shows the number of incidents. This chart helps visualize the overall trend of security incidents affecting the brand and identify periods of increased activity or vulnerability.

Another visualization presents a geographic heatmap illustrating the distribution of security incidents geographically. Each incident is plotted on a map, with color intensity representing the concentration or severity of incidents in different regions. Stakeholders can zoom in on specific areas to identify hotspots of security activity or vulnerability. This visualization helps understand the geographic spread of security threats and prioritize mitigation efforts in high-risk areas.

Brand-Focused Listing Management Engine

Brand-focused listing management engine 120C accesses an item listing associated with an item listing system and analyzes the item listing using brand-focused machine learning model 140 that is trained based on a multi-dimensional authenticity analysis dataset 114 and brand multi-dimensional authenticity features. The brand-focused machine learning model 140 is integrated into a brand-focused listing management tool that employs the brand-focused listing management engine 120C of the item listing system 100 to support brand-focused listing management.

Based on analyzing the item listing, the brand-focused listing management engine 120C generates a brand-focused security notification associated with the item listing. Generating the brand-focused security notification is based on identifying a predicted brand for the item listing, where the item listing does not include a brand input. A brand-focused security notification is a communication or alert specifically designed to inform stakeholders, such as customers, partners, and employees, about security incidents or threats that directly impact the brand's reputation, trustworthiness, or integrity.

The brand-focused listing management engine 120C communicates the brand-focused security notification. The brand-focused security notification is communicated to a seller associated with the item listing and a security administrator of the item listing system; or to an administrator; or another service of the brand-focused listing management engine 120C. Based on the brand-focused security notification, brand-focused listing management engine 120C executes a listing quality analysis based in part on brand-focused security data associated with the brand-focused security notification. A listing quality analysis involves a thorough evaluation of item listings encompassing various attributes such as titles, descriptions, images, prices, and reviews.

The listing quality analysis can be focused on fraud, such that the listing quality analysis involves a meticulous examination of an item listing to identify potential fraudulent activities or listings. This comprehensive evaluation includes scrutinizing various attributes such as product titles, descriptions, images, prices, and seller information. Data collection involves gathering information from listings and analyzing it for inconsistencies, irregularities, or red flags that may indicate fraudulent behavior. Attributes such as excessively low prices, misleading descriptions, or suspicious seller profiles are flagged for further investigation. Content analysis delves into the accuracy and authenticity of product information, ensuring that listings are transparent and comply with platform policies. Image quality assessment verifies the legitimacy of product images and their correspondence with the listed items. Pricing analysis includes comparing prices with market averages and identifying anomalies suggestive of fraudulent pricing practices.

Additionally, seller reputation and past transaction history are examined to assess credibility and detect patterns of fraudulent behavior. Recommendations for fraud prevention and mitigation strategies are then generated based on the analysis findings, with a focus on enhancing listing verification processes, implementing stricter seller vetting procedures, and enhancing fraud detection algorithms. Continuous monitoring and iteration are performed to adapt to evolving fraud tactics and ensure the integrity and security of the item listing system. Based on the listing quality analysis, the item listing can be flagged for remedial action.

In one embodiment, listing management can include limiting the visibility of listings until brand information is confirmed or corrected. Listings with uncertain or unverified brand details may be temporarily hidden from general view, prompting sellers to update and verify the information promptly. Initially, listings are flagged and remain hidden from general view if they lack verified brand details, prompting sellers to update and confirm information promptly through a user interface. A machine learning model predicts brands based on listing attributes like descriptions and images, verifying or suggesting corrections. Sellers are notified to review and amend brand information, triggering re-evaluation and updating visibility status once verified.

Figure 2A:
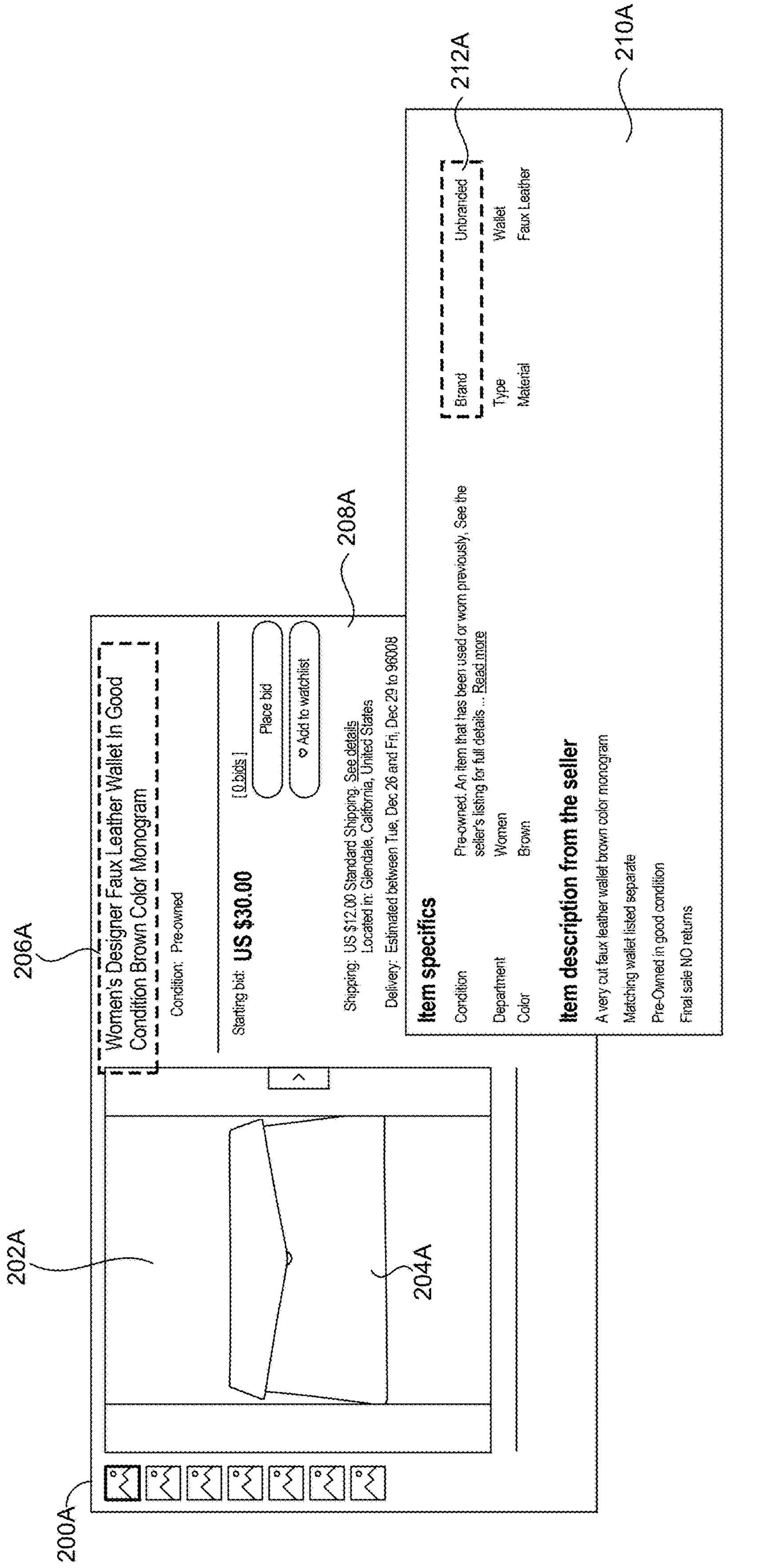
FIGS. 2A-2C are schematics and interfaces associated with providing brand-focused artificial intelligence system management in an item listing system, in accordance with aspects of the technology described herein.

Turning to FIG. 2A, FIG. 2A illustrates example item listing interface 200A associated with a missing brand information. The item listing interface 200A for a purse item 202A having an image showcasing the purse design details, alongside, a descriptive title 206A that specifies the style, and any unique features. Price and availability information are presented in item listing interface portion 208A allowing users to assess the item's value and stock status. Item listing interface portion 210A includes item specifics and item description from the seller. However, the brand information is missing and listed as "unbranded". The brand information may have been omitted unintentionally or intentionally. As such, the brand-focused artificial intelligence system can be used to analyze this type of item listing for predicting a brand, enforcing brand security policies, or item listing management.

Figure 2B:
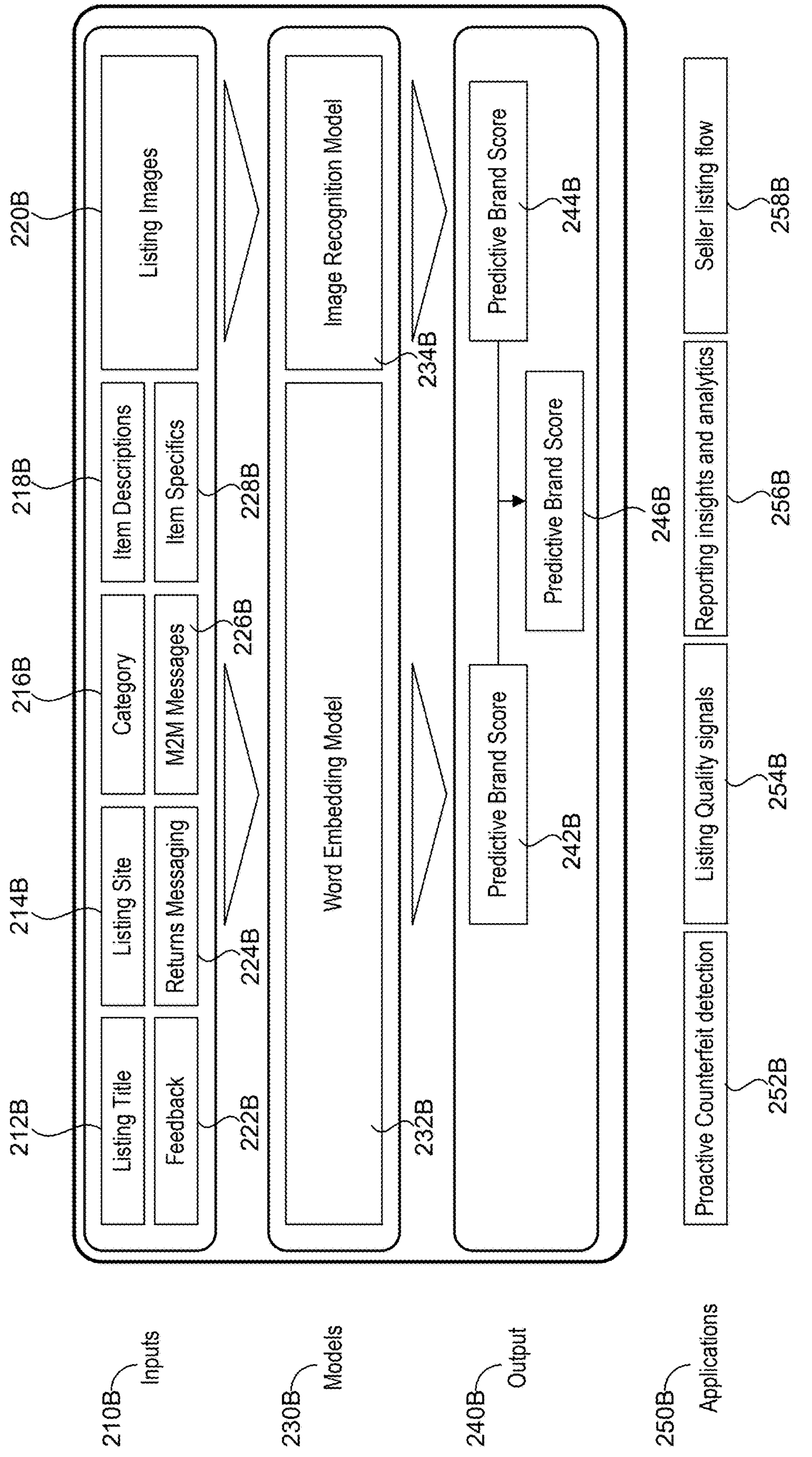

Turning to FIG. 2B, FIG. 2B illustrates example brand-focused artificial intelligence system associated providing brand-focused artificial intelligence management in accordance with embodiment described herein. At a high level, inputs 210 are processed and analyzed via machine learning (ML) models 230B (e.g., brand-focused machine learning models). Inputs 210 serve as a foundation for the ML models 230B to make predictions to generate output 240 (e.g., a predicted brand). The brand-focused artificial intelligence system integrates different types of application (or services) that employ the output 240 information. Inputs 210 can include listing title, listing site 214B, category 216B, item descriptions 218B, listing images 220, feedback 222B, return messaging 224B, machine-to-machine (M2M) messages, and item specifics 228B. Each input can operate as an indicator for the ML models 230 to predict a brand for an item listing without a brand that is associated with the inputs 210. For example, a listing site 214B enables tailored approaches to evaluate fraud patterns, market dynamics, payment methods, language and cultural factors, and geolocation data. Fraudulent activities often vary based on geographic location. Certain types of scams or fraudulent behaviors may be more prevalent in specific regions due to cultural factors, economic conditions, or technological infrastructure. Analyzing regional fraud patterns helps tailor fraud detection strategies to address specific risks associated with brands The ML models 230B can include a word embedding model 232B and an image recognition model 234B. It is contemplated that the ML models 230B can operate independently or combined, or as a multi-modal model to provide brand prediction functionality. For example, these two models operate independently, each producing its own prediction brand score for a given item listing. However, to enhance the accuracy and reliability, the prediction brand scores from both models can be combined using an ensemble method such as: voting ensemble, where each model's prediction brand score is treated as a "vote" for a predicted brand. The final prediction is determined by aggregating these votes, such as taking the average or weighted average of the scores. This approach leverages the collective insights of multiple models to make a more informed decision. A stacking ensemble uses prediction brand scores from both models are used as features to train a meta-model, which learns how to best combine these scores to make a final prediction. This meta-model effectively learns the strengths and weaknesses of each base model and optimally integrates their predictions to improve overall performance.

In addition to generating prediction brand scores for predicting missing brands within item listings, various types of information can be generated and integrated to output 240B to enhance the accuracy and depth of the analysis. Alongside the predicted missing brand itself, key contextual details such as the product description, category, and price range offer valuable insights into potential brand associations. Analysis of similar products, user reviews or ratings, and seller information further enriches understanding by elucidating common brand mentions, sentiments, and seller-brand relationships. Leveraging image recognition techniques can provide visual cues from product images, aiding in the identification of logos or trademarks associated with specific brands. Additionally, access to external databases or repositories of brand information enables comprehensive comparison and validation of predicted brands against established brand catalogs. By synthesizing these diverse sources of information, the machine learning model can generate more accurate predictions, ultimately facilitating improved decision-making and data-driven insights within the domain of brand identification and analysis within item listings.

The output 240B can be communicated to application associated proactive counterfeit detection 252B, listing quality signals 254B, reporting insights and analysis 256B, and seller listing flow 258B. Proactive counterfeit detection 252B can include the practice of actively identifying and preventing the sale of counterfeit or fraudulent items before they are listed or sold on a platform. It involves processes to detect suspicious listings, verify the authenticity of products, and take preemptive action to remove or block fraudulent sellers or listings. Listing quality signals 254B are indicators or metrics used to assess the quality, accuracy, and reliability of listings on a platform. Listing quality signals 254B may include factors such as detailed product descriptions, high-quality images, accurate categorization, competitive pricing, positive user reviews, and seller reputation. Monitoring and analyzing these signals help platforms ensure a positive user experience, maintain trust, and mitigate risks such as counterfeit products or misleading listings.

Reporting insights and analysis 256B involves gathering, analyzing, and deriving actionable insights from reports submitted by users, moderators, or automated systems regarding various aspects of platform activity, such as suspicious behavior, policy violations, or user feedback. Reporting insights and analysis enable platforms to identify trends, patterns, and areas of concern, make informed decisions, and implement targeted interventions to address issues and improve platform integrity and user satisfaction.

Seller listing flow 258B refers to step-by-step process that sellers follow to create and publish listings on a platform. The seller listing flow 258B typically includes tasks such as entering product details, uploading images, setting pricing and inventory information, selecting categories or tags, and submitting the listing for review or publication. Optimizing the seller listing flow involves streamlining the process, providing guidance or tools to improve listing quality, and implementing checks or validations (e.g., absence of brand information) to prevent errors or policy violations, ultimately enhancing the efficiency and effectiveness of seller activities on the item listing platform.

Figure 2C:
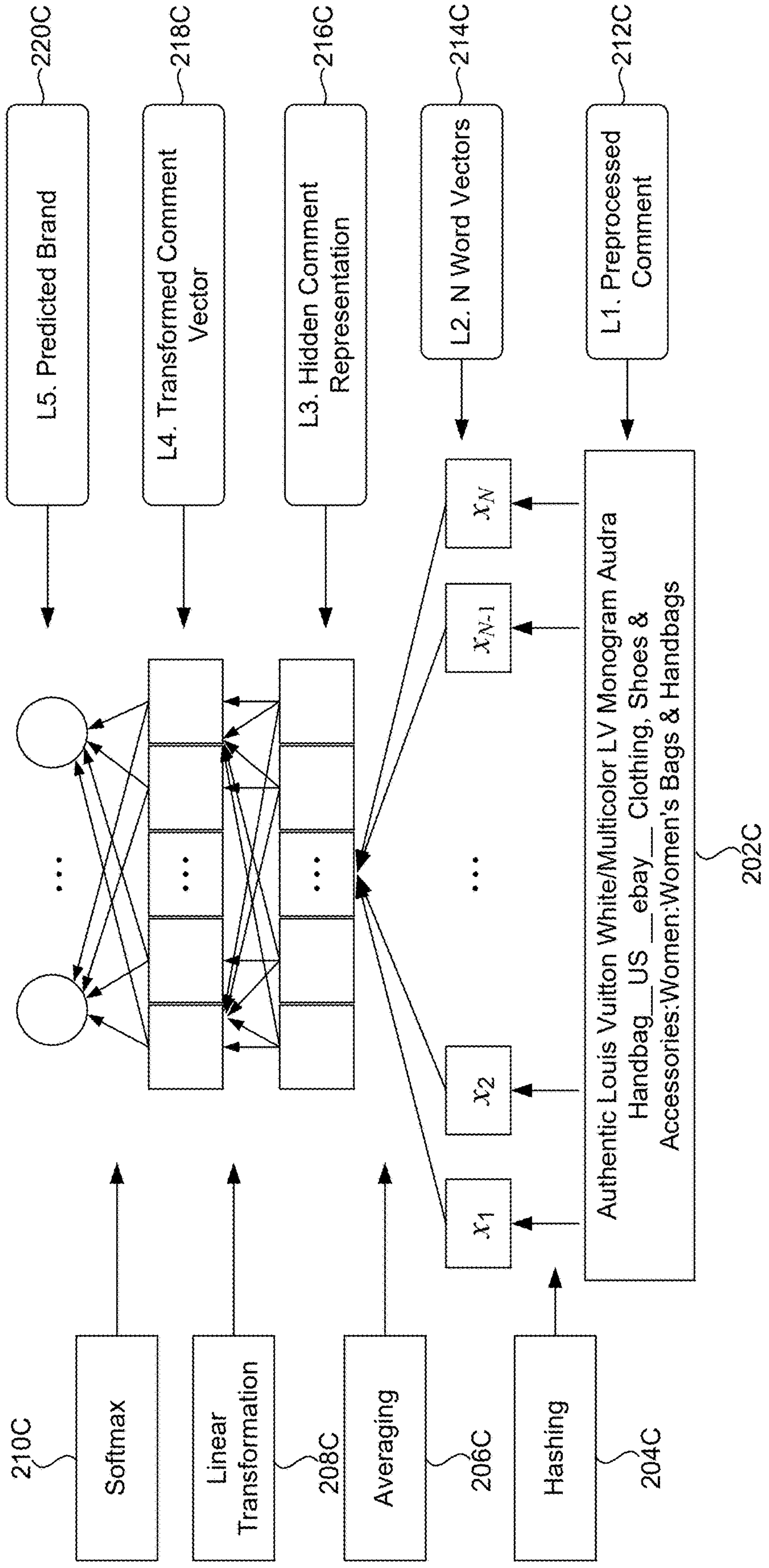

Turning to FIG. 2C, FIG. 2C illustrates example brand-focused machine learning model flow associated generating a predicted brand in accordance with embodiment described herein. For example, the brand-focused machine learning model can be a word embedding model that takes as input 202C and employs hashing 204C, averaging 206C, linear transformation 208C and softmax 210C operations on pre-processed comments 212C to generate word vectors 214C, a hidden comment representation 215C, a transformed comment vector 218C, and a predicted brand output 220C.

Input Preprocessing: Comments are preprocessed (e.g., L1. Preprocessed Comment) to remove punctuation, convert text to lowercase, and tokenize the words.

Hashing 204C: Hashing is used to map each word to a fixed-size vector representation. Instead of using a traditional lookup table for word embeddings, a hashing function is applied to convert each word into a fixed-size hash value. This ensures efficient memory usage and scalability, especially for large vocabularies.

Averaging 206C: The hashed word vectors (e.g., L2. N Word Vectors) are averaged to obtain a single vector representation for the entire comment. This average vector captures the overall semantic meaning of the comment by aggregating information from individual word embeddings.

Hidden Comment Representation 210C: The hidden comment vector (e.g. (e.g., L3. Hidden Comment Representation) serves as the hidden representation of the comment. This vector encapsulates the learned features and semantic information extracted from the comment, which are crucial for sentiment analysis.

Linear Transformation 208C: A linear transformation is applied to the averaged vector to project it onto a higher-dimensional space (e.g., L4. Transformed Comment Vector). This transformation helps capture complex relationships and patterns in the comment data that may not be captured by the original word embeddings.

Predicted Output: Finally, the hidden comment representation is fed into a classifier, such as a softmax layer, to predict the brand of the comment (e.g., GUCCI, COACH, or LOUIS VUITTON). The softmax operation calculates the probabilities of each possible sentiment label based on the learned features. Each brand label corresponds to a class, and the classifier outputs the predicted brand label with the highest probability as the predicted brand for the item listing. The classifier's output provides the predicted brand label based on the learned features and representations extracted from the comment data.

Figure 3:
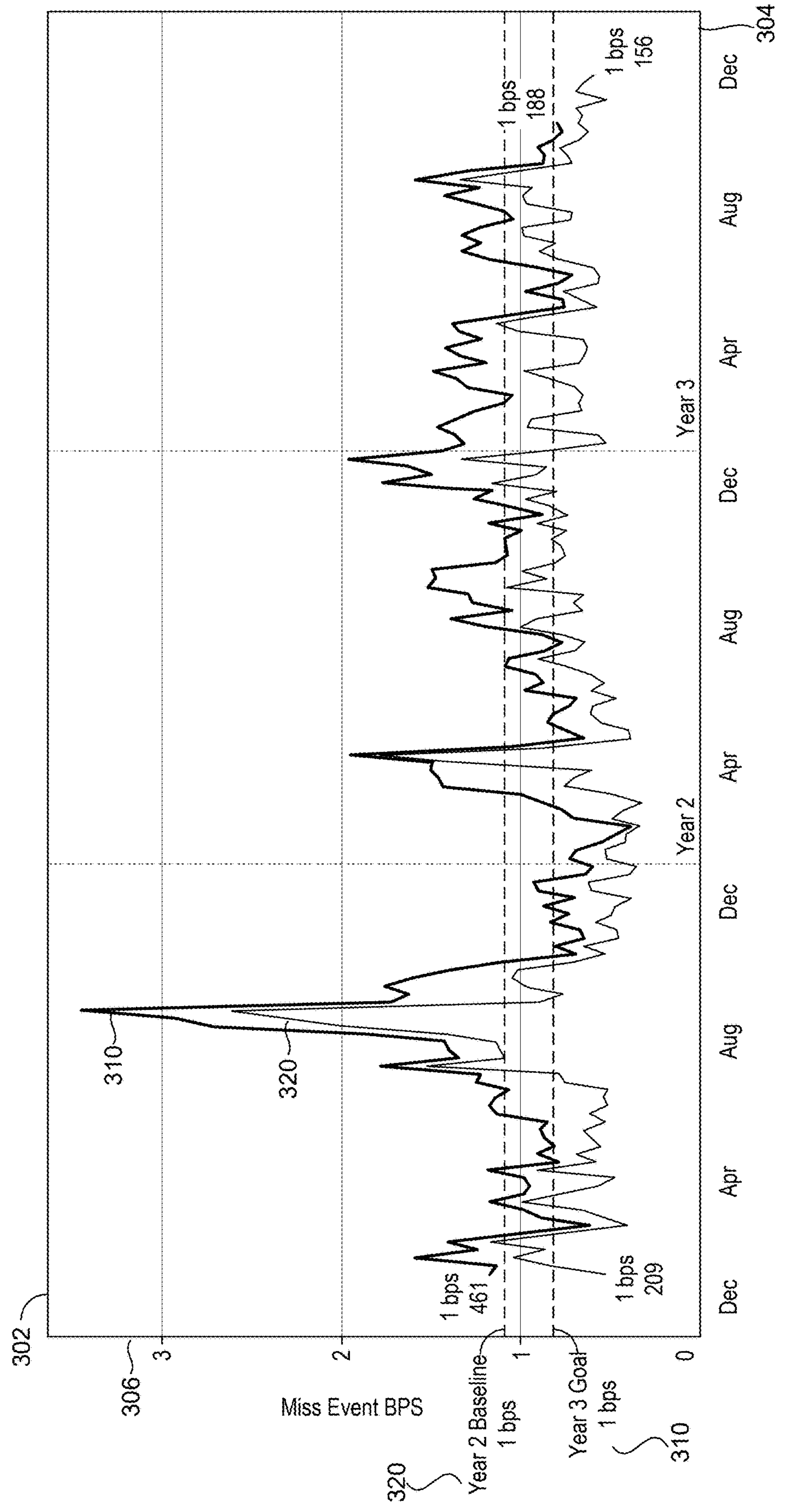
FIG. 3 is an interface associated with providing brand-focused artificial intelligence system management in an item listing system, in accordance with aspects of the technology described herein.

Turning to FIGS. 3, 4, 5, and 6, the figures illustrate corresponding interfaces and schematics associated with brand security. For example, the interfaces can be associated with a security administrator tool that supports review details of individual item listing and their corresponding details. With reference to FIG. 3, FIG. 3 illustrates graph 302 that presents a comprehensive overview of miss events occurring throughout the year, for example, with a focus on the months of December, April, and August. The x-axis 304 of the graph denotes the progression of time, delineated by the months of the year, namely December, April, and August. Meanwhile, the y-axis 306 quantifies the total number of miss events recorded during each respective month. For each month, a data point is plotted on the graph to represent the total count of miss events observed. These data points are interconnected to form lines (e.g., 310 and 320), creating distinct visual representations for December, April, and August.

In addition to showcasing the monthly miss event data, the graph incorporates dotted lines to delineate two components: goal misses (e.g., 310) for the year and a historical baseline (e.g., 310). The dotted lines indicating goal misses 310 for the year serve as benchmarks or predetermined targets set to gauge performance. These lines extend horizontally across the graph, intersecting with each month's data point. They provide a clear visual reference, enabling stakeholders to assess whether the total miss events for a given month align with the established goals for the year. Furthermore, the graph features a historical baseline 320 represented by another dotted line. This baseline reflects the average or historical trend of miss events observed throughout the year. It serves as a point of comparison, allowing viewers to evaluate current performance relative to past patterns.

Within this context, "bps" stands for basis points, a unit of measurement to quantify small percentage changes. In the context of this graph, bps could indicate deviations from the historical baseline or goal misses expressed in terms of percentage points. For instance, if the actual miss events surpass the baseline or fall short of the goal, the deviation may be quantified in bps to provide a precise understanding of the magnitude of the variance. Overall, the graph offers a comprehensive visualization of miss events, facilitating informed decision-making and strategic planning by providing insights into performance relative to goals and historical trends.

Figure 4:
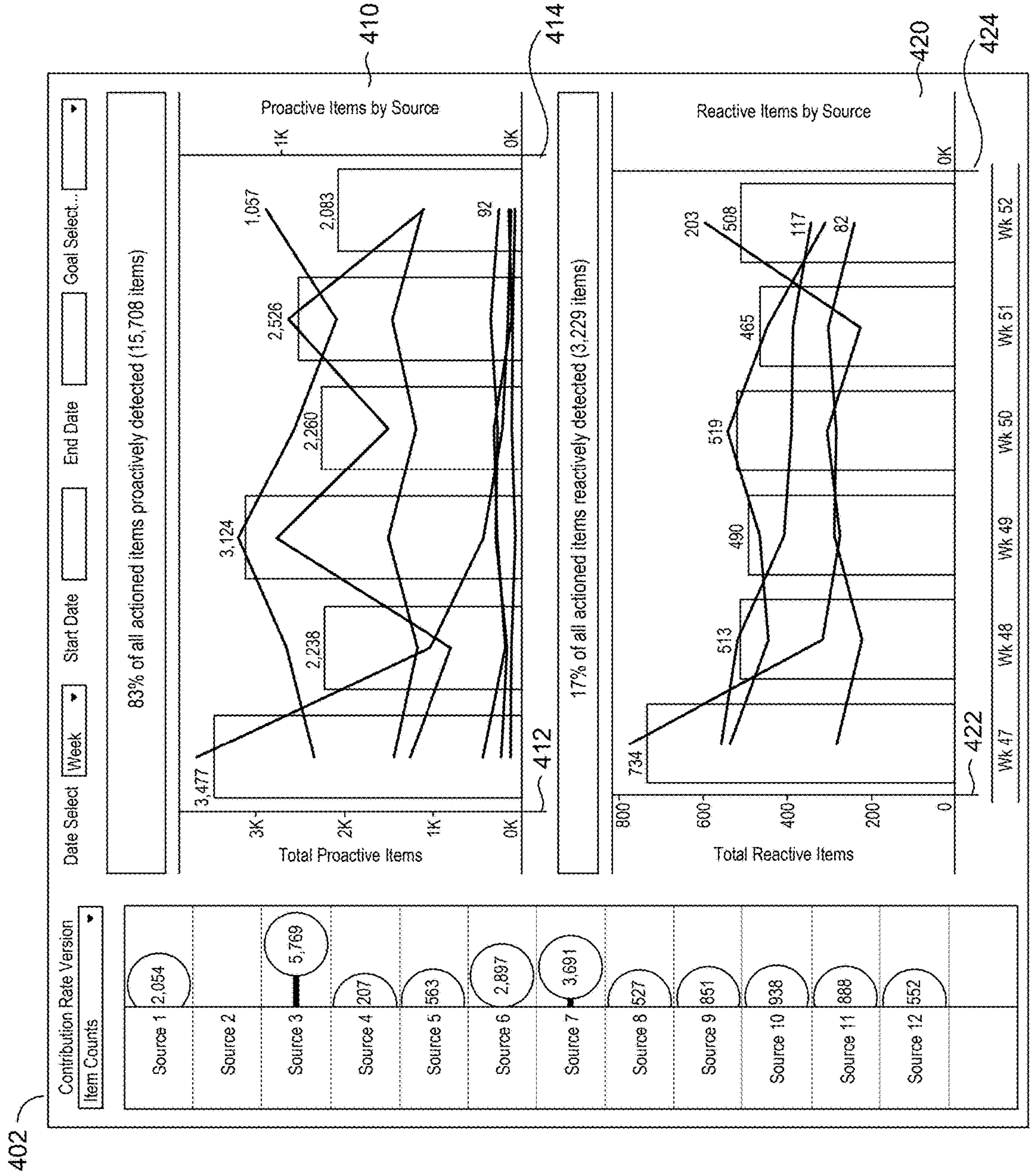
FIG. 4 is an interface associated with providing brand-focused artificial intelligence system management in an item listing system, in accordance with aspects of the technology described herein.
Figure 5:
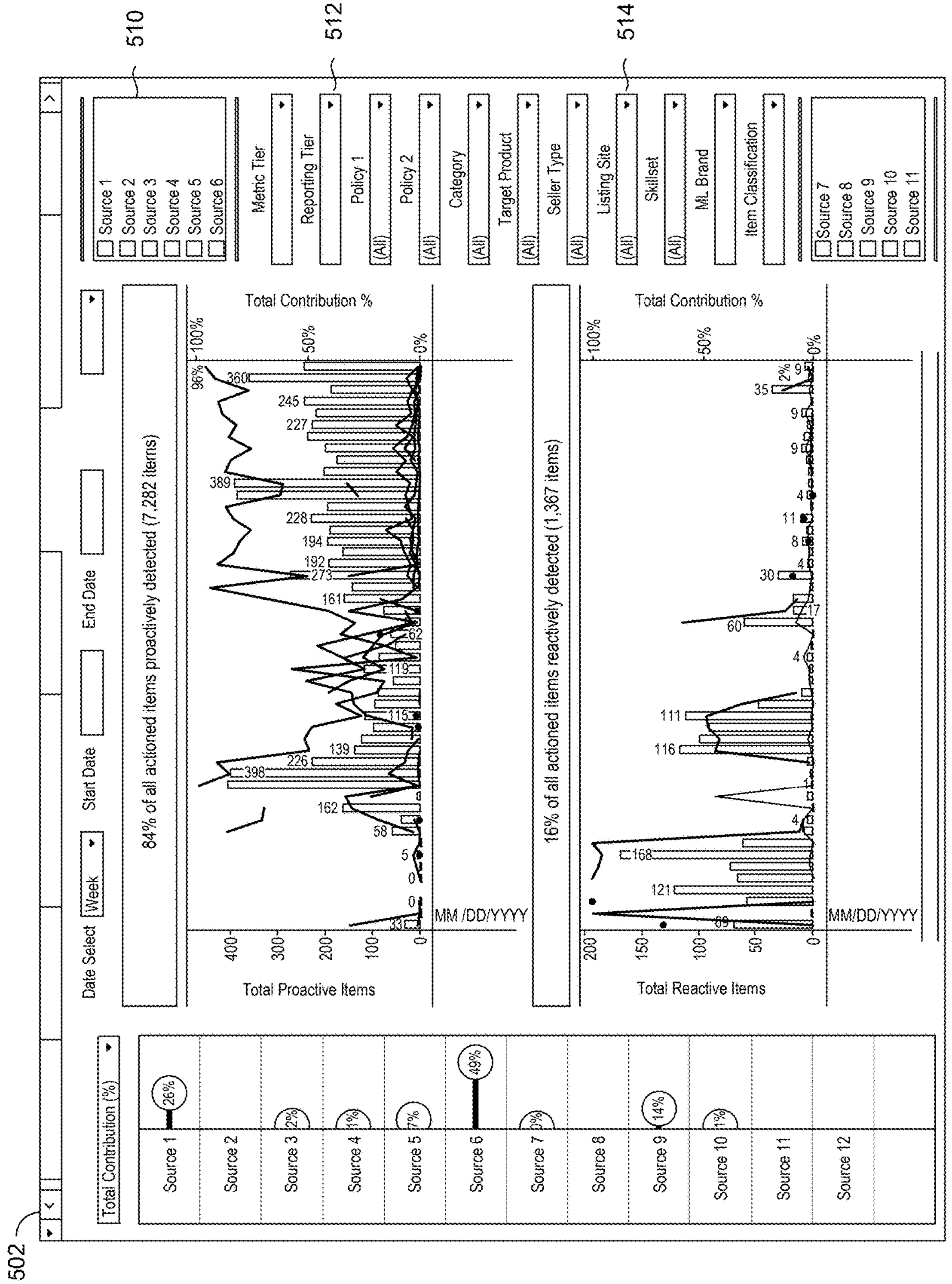
FIG. 5 is an interface associated with providing brand-focused artificial intelligence system management in an item listing system, in accordance with aspects of the technology described herein.
Figure 6:
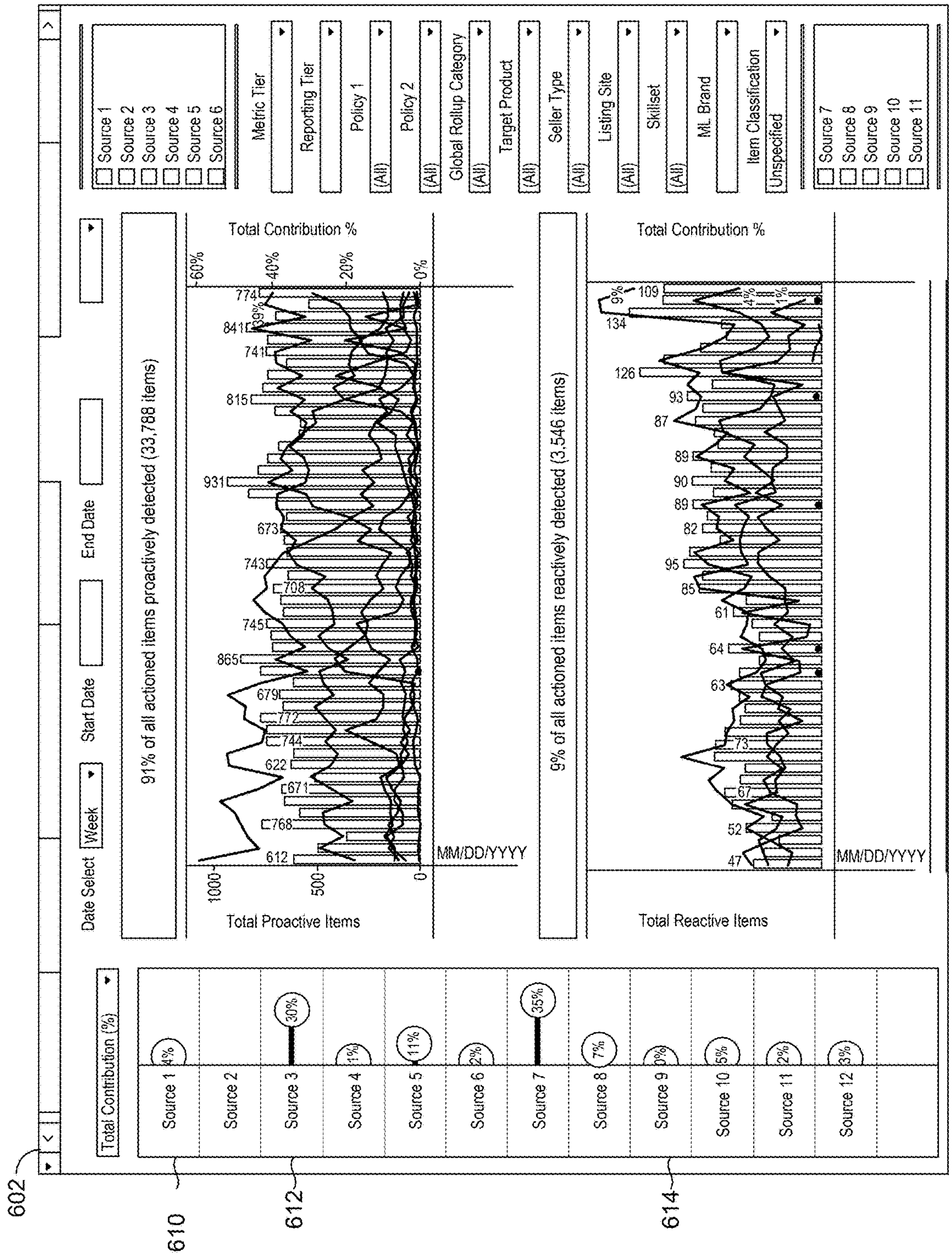
FIG. 6 is an interface associated with providing brand-focused artificial intelligence system management in an item listing system, in accordance with aspects of the technology described herein.

With reference to FIGS. 4, 5, and 6, FIG. 4 illustrates an example dashboard interface 402 with graphs (e.g., graph 410 and graph 420) associated with total suspicious item listings (e.g., y-axis 412) identified using proactive method and total suspicious item listings identified (e.g., y-axis 422) using reactive methods. The graph may charted on a weekly basis (e.g., x-axis 412 and x-axis 422). For example, graph 410 provides a visual representation of the total number of suspicious item listings identified on a weekly basis through proactive methods. The x-axis of the graph denotes the progression of time, segmented into weeks, while the y-axis quantifies the total count of suspicious listings. Proactive methods for detecting actual or potential ("suspicious") fraudulent listings involve employing preemptive strategies and advanced algorithms to identify potential instances of fraud before they escalate. These methods typically involve data analytics, machine learning algorithms, and pattern recognition techniques to detect anomalies or suspicious patterns in listing behavior. Each data point on the graph 410 represents the cumulative count of suspicious item listings identified through proactive methods during a specific week. These data points are interconnected to form a line graph, illustrating the trend in proactive detection efforts over time. The graph may exhibit fluctuations in the number of suspicious listings identified from week to week, reflecting variations in the effectiveness of proactive detection measures or changes in fraudulent activity patterns.

Moving on to the second graph 420, which illustrates suspicious item listings identified using reactive methods, graph 430 depicts the total number of suspicious item listings identified on a weekly basis through reactive methods. Similar to graph 410, the x-axis represents time in weeks, while the y-axis indicates the total count of suspicious listings.

Reactive methods for detecting actual or potential ("suspicious") listings involve responding to reported instances of suspicious activity or anomalies identified through customer complaints, manual reviews, or post-transaction monitoring. These methods rely on human intervention and investigative techniques to address fraudulent activity after it has occurred. Each data point on the graph 420 represents the cumulative count of suspicious item listings identified through reactive methods during a specific week. Like the first graph 410, these data points are connected to form a trend line, illustrating the trajectory of reactive detection efforts over time. The graph may reveal fluctuations in the number of suspicious listings identified through reactive methods, reflecting variations in the volume of reported incidents, the efficiency of investigative processes, or changes in consumer behavior patterns. Overall, these two graphs provide valuable insights into the effectiveness of both proactive and reactive methods for detecting suspicious item listings, enabling stakeholders to assess the efficacy of their fraud detection strategies and make informed decisions to mitigate risks.

With reference to FIGS. 5 and 6, these figures illustrate dashboard interface 502 and dash and dashboard 602. Dashboard interface 502 includes a first interface portion 510 that provides selectable filters (filter 512 and filter 514) that can be used to filter the data associated with the dashboard interface. Dashboard interface 602 includes a second interface portion 610 that provides sources (source 3 612 and source 9 614) that indicate correspond count or percentage of proactive items and/or reactive items associated with a corresponding source. The dashboard interfaces can be associated with different types of brand security functionality associated with brand monitoring, listing analysis, geographic analysis, user feedback and reporting, interface features, and graphs and charts.

By way of illustration, the dashboard may illustrate a dynamic trend chart further elucidates the fluctuating patterns of fraudulent activities over time, empowering administrators to discern emerging trends and respond accordingly. The dashboard facilitates vigilant brand monitoring, a critical component of fraud detection and prevention. Administrators are presented with an intuitive interface where they can manage a list of monitored brands, effortlessly adding or removing entities under surveillance. Real-time alerts are seamlessly integrated, instantly notifying administrators of any suspicious listings associated with monitored brands, ensuring swift intervention to safeguard brand integrity.

Moreover, the dashboard can support presenting data associated with analysis of individual listings flagged as fraudulent. Each flagged listing is meticulously cataloged, accompanied by thumbnail images for quick visual identification. Pertinent details such as seller information, listing date, price, and location are meticulously cataloged, providing administrators with a holistic understanding of the fraudulent activity at hand. Administrators can delve deeper into each listing, accessing a trove of detailed information and actionable insights, empowering them to take decisive measures such as removing listings or blocking sellers.

The dashboards can provide geographic visualizations, presenting administrators with an interactive map interface depicting the spatial distribution of fraudulent listings. A dynamic heatmap overlays the map, vividly illustrating areas with the highest concentration of fraudulent activities. Administrators can seamlessly drill down into specific regions or cities, facilitating targeted interventions to curb fraudulent activities at their source.

The dashboard incorporate robust user feedback and reporting mechanisms. Users are empowered to report suspicious listings or activities, contributing to the collective efforts in combating fraud. A dedicated section supports flagging potential fraudulent activities for administrative review. Flagged listings are prominently highlighted, ensuring they are immediately brought to the attention of administrators. Clicking on a flagged listing unveils a wealth of detailed information, enabling administrators to delve deeper into the intricacies of each case. From product descriptions to seller histories, every facet of the listing is meticulously documented, empowering administrators to make informed decisions. Furthermore, the interface boasts seamless communication tools, enabling administrators to engage with sellers directly, fostering dialogue and facilitating resolutions. For escalated cases, an efficient escalation mechanism is in place, ensuring that serious incidents are promptly elevated to the appropriate authorities for further action. Administrators can harness the power of data analytics to analyze fraudulent item listings, identifying recurring patterns or emerging trends to bolster fraud prevention measures.

Additionally, a plethora of graphs and charts are accessible via the dashboard, transforming raw data into actionable insights. A time-series chart tracks the trajectory of fraudulent activities over time, enabling administrators to discern temporal patterns and anticipate future trends. A pie chart delineates the distribution of fraudulent listings across various product categories, shedding light on areas warranting heightened scrutiny. A bar chart showcases the top brands implicated in fraudulent activities, facilitating targeted interventions to safeguard brand integrity. Finally, an interactive heatmap offers a spatial perspective, highlighting regions grappling with rampant fraudulent activities, guiding administrators in deploying resources strategically to combat fraud effectively. In essence, the dashboard enables implement brand security measures associated with the brand-focused machine learning model for identifying fraudulent activities, equipping administrators with the tools and insights needed to uphold the integrity of the item listing system and protect the interests of users and stakeholders alike.

Figure 7A:
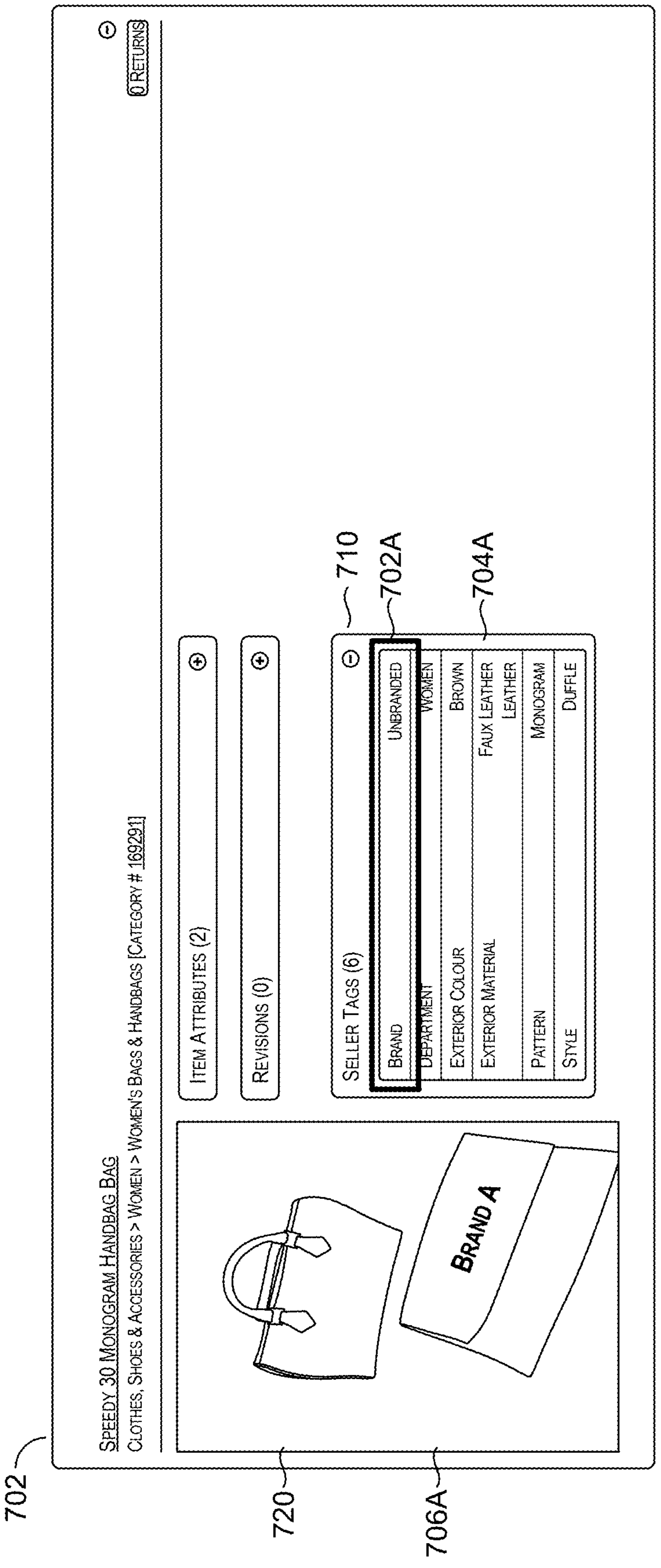
FIGS. 7A-7C are interfaces associated with providing brand-focused artificial intelligence system management in an item listing system, in accordance with aspects of the technology described herein.
Figure 7B:
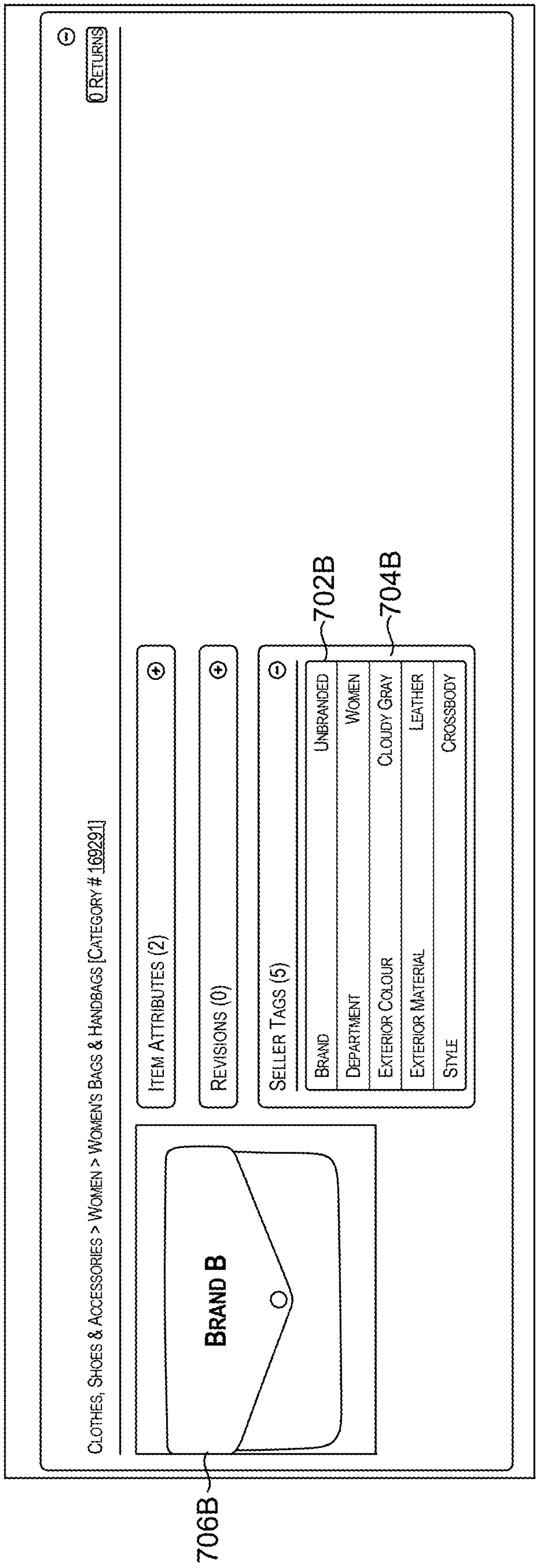
Figure 7C:
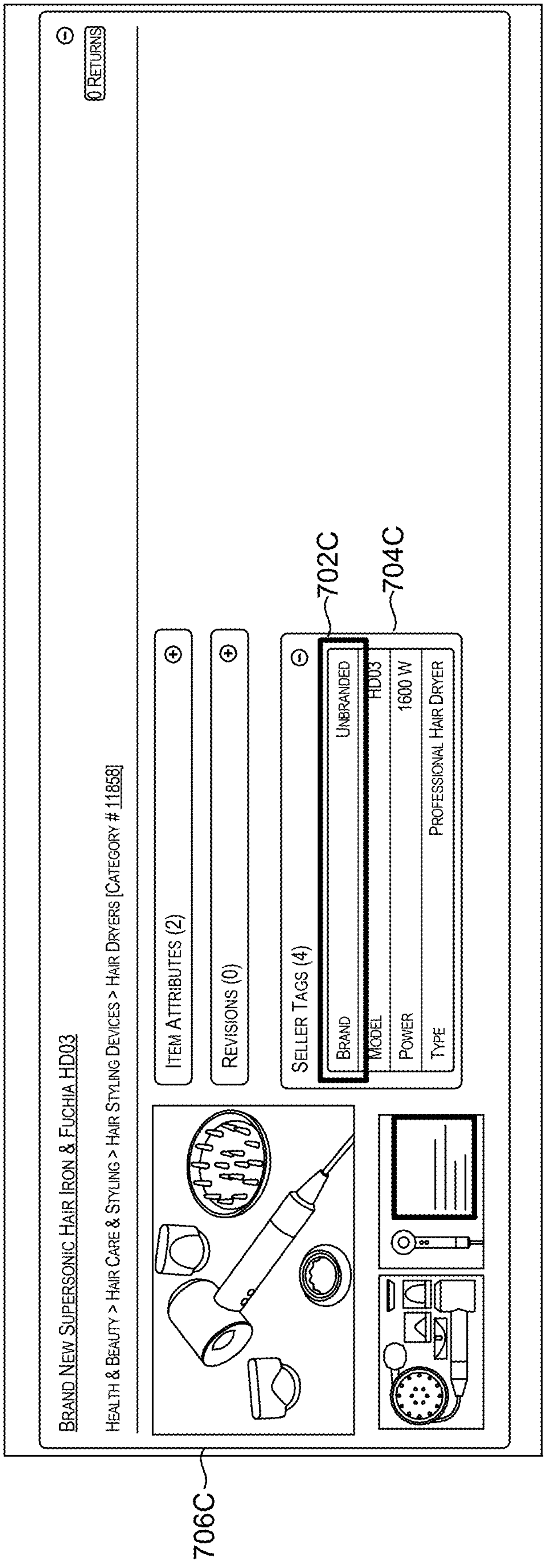
Figure 8:
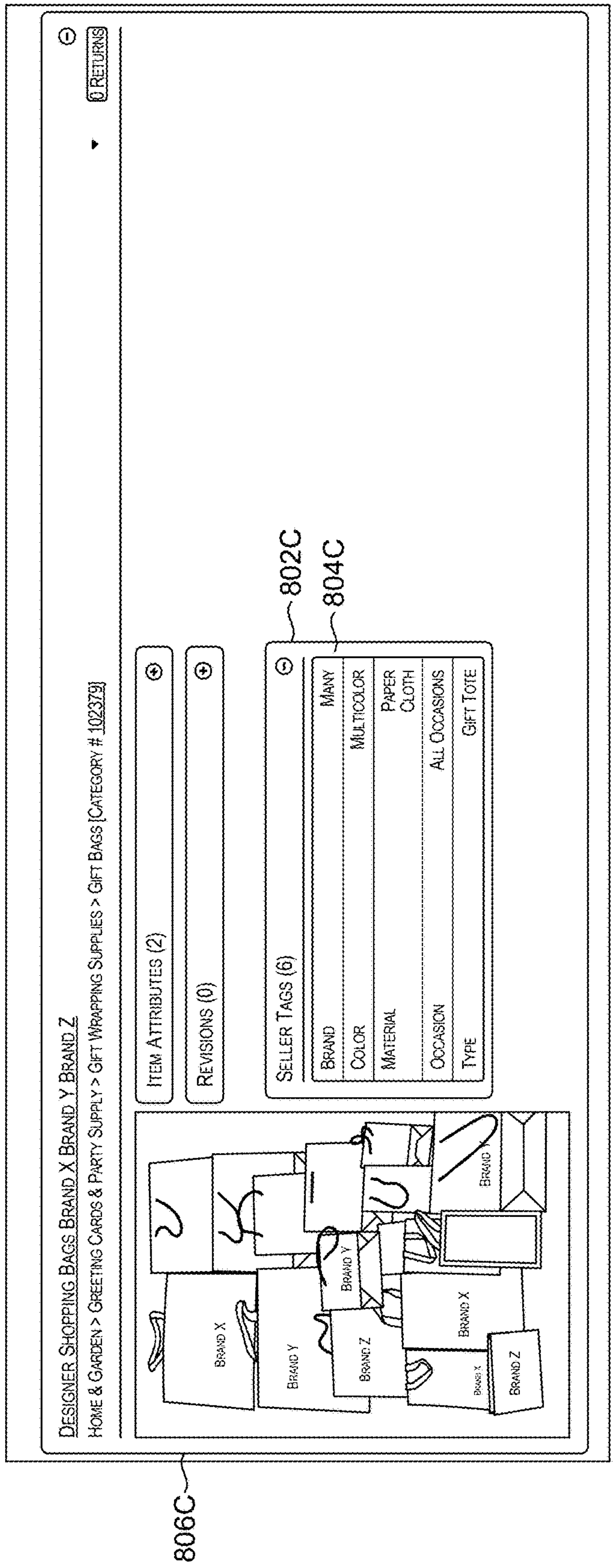
FIG. 8 is an interface associated with providing brand-focused artificial intelligence system management in an item listing system, in accordance with aspects of the technology described herein.
Figure 9A:
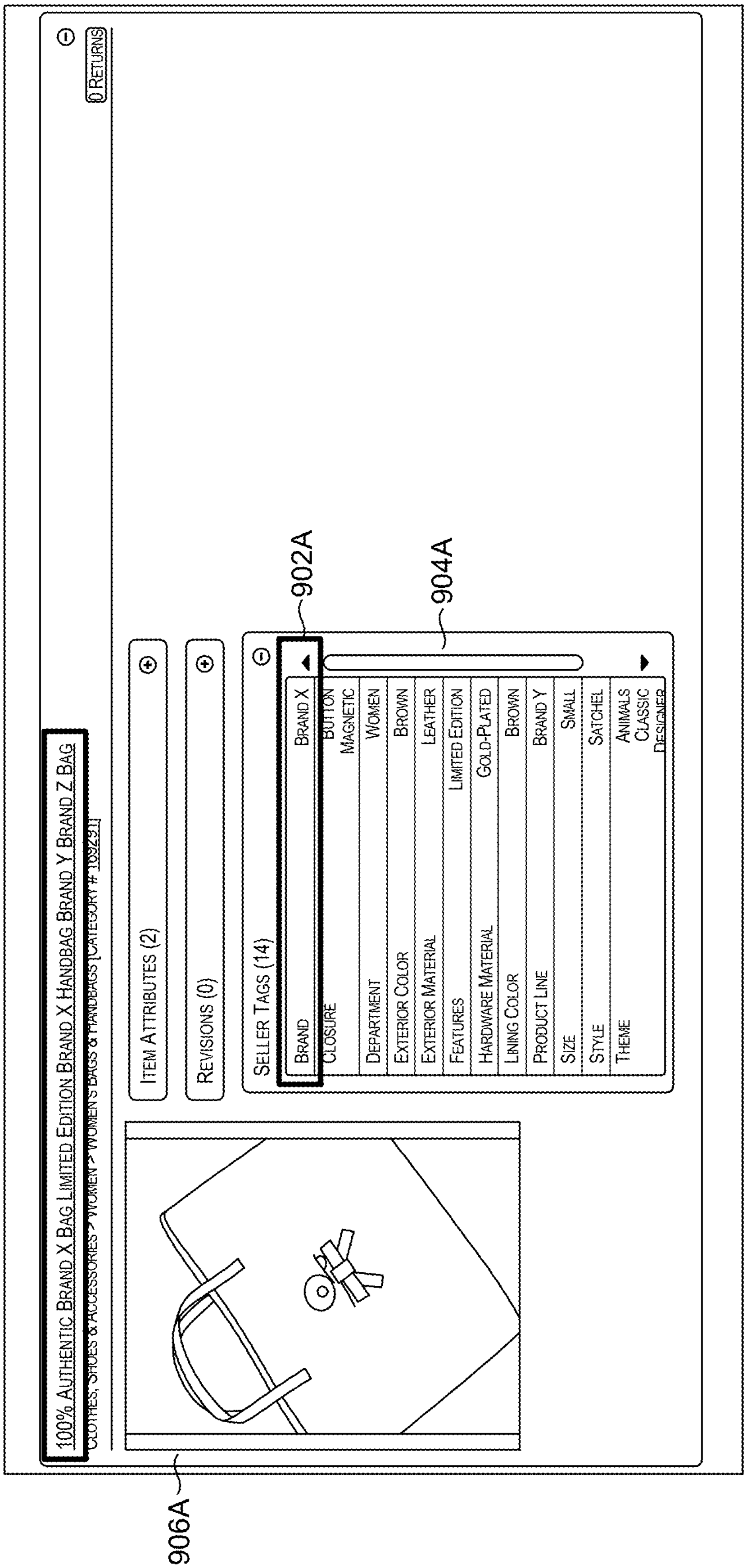
FIGS. 9A-9B are interfaces associated with providing brand-focused artificial intelligence system management in an item listing system, in accordance with aspects of the technology described herein.
Figure 9B:
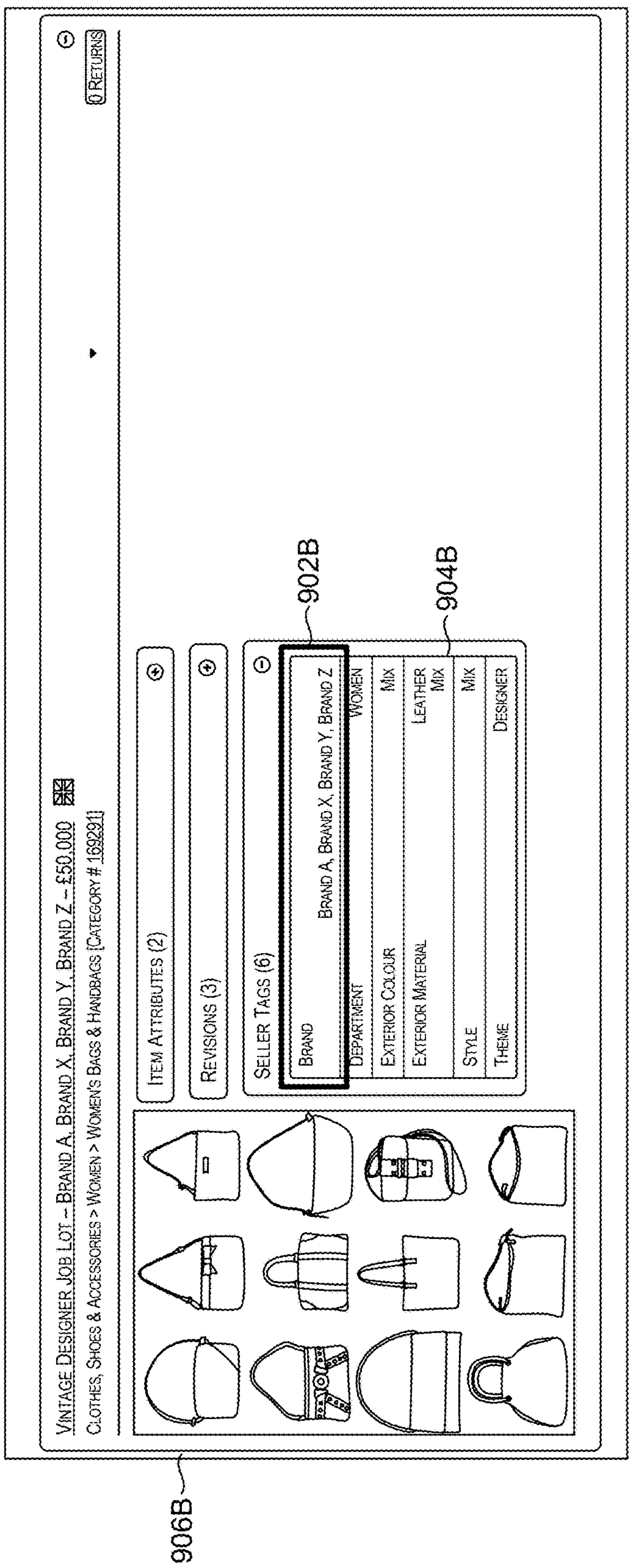

Turning to FIGS. 7A, 7B, 7C, 8, 9A and 9B, the figures illustrate corresponding interfaces associated with item listings. For example, the interfaces can be associated with a security administrator tool that supports review details of individual item listing and their corresponding details. FIGS. 7A, 7B, and 7C illustrate cases of true positives, where the brand-focused machine learning model correctly predicted a correct brand; FIG. 8 illustrates an instance of a false positive and FIGS. 9A and 9B illustrate unusual cases.

A true positive occurs when the model correctly identifies a listing as belonging to a specific brand, and this prediction is indeed accurate upon verification. Essentially, it signifies that the model correctly detects the presence of the brand it was designed to recognize. A false positive occurs when the model incorrectly predicts the presence of a specific brand in a listing that does not actually belong to that brand upon verification. Unusual cases refer to instances or situations within a given context (e.g., item listing information) that deviate significantly from the norm or expected patterns. These cases often exhibit characteristics, behaviors, or outcomes that are uncommon, unexpected, or irregular compared to the typical occurrences in the domain under consideration. False positives and unusual cases may alternative handling mechanism for brand security. For example, these types of cases can be escalated, for example, elevating instances flagged as outliers or anomalies to higher levels of scrutiny or decision-making within the organization. This may entail routing unusual predictions to domain experts, senior data scientists, or management for further analysis, validation, or intervention. The goal is to ensure that these cases receive appropriate attention and action, including manual review, model refinement, or process improvement, to enhance the accuracy and reliability of the brand prediction system. Other variations and combinations of handling false positives and unusual cases are contemplated with embodiment described herein.

Finally, a confidence score (i.e., prediction brand score) represents the level of certainty or confidence that the model has in its prediction. It indicates the model's belief in the correctness of its classification output. The confidence score typically ranges between 0 and 1, with 0 indicating low confidence and 1 representing high confidence. For instance, if the model assigns a confidence score of 0.8 to a prediction, it implies that the model is 80% confident in its classification decision.

With reference FIGS. 7A, 7B, and 7C, as discussed, input data associated with an item can be used to generate a predicted brand. For illustration, an example item listing information interface 702 is provided we will discuss the seller tags shown in the seller tags interface portion 710 including seller-provided brand and the images in the image portion 720 of the interface. In FIG. 7A, the brand 702A is "unbranded" and processing this item listing via the brand-focused machine learning model may predict the brand as "BRAND A" with a predicted brand score of: 0.99996. The prediction may be based on seller tags 704A (e.g., Faux leather, Monogram, Duffle) and/or the corresponding image 708A. In FIG. 7B, the brand 702B is "unbranded" and processing this item list may predict the brand as "BRAND B" with a predicted brand score of: 1.0. The prediction may be based on seller tags 704B (e.g., e.g., Leather, Crossbody) and/or the corresponding image 706B. In FIG. 7C, the brand 702C is "unbranded" and processing this item list may predict the brand as "BRAND C" with a predicted brand score of: 0.99494. The prediction may be based on seller tags 704C (e.g., HD03, 1600W, Professional Hair Dryer) and/or the corresponding image 706C.

With reference to FIG. 8 that illustrates a false positive. In FIG. 8, the brand 802C is "many" and processing this item list may predict the brand as "BRAND X" with a predicted brand score of: 0.800098. The prediction may be based on seller tags 804C (e.g., Paper Cloth, All Occasions, Gift tote) and/or the corresponding image 806C.

With reference to FIGS. 9A and 9B, these address unusual cases. FIG. 8A includes a seller-provided brand 902A as "BRAND X", but a product line "BRAND Y" in the seller tags 904A and an image of a BRAND X purse. The generated predicted brand can be "BRAND X" with a predicted brand score of: 0.9992. However, this information conflicts with the product line. As such, this may be a candidate for further review (e.g., an item listing quality analysis and notification to update the seller tags).

FIG. 9B includes a seller-provided brand 902B of "BRAND A, BRAND X, BRAND Y, BRAND Z" and several seller tags (e.g., mix, leather mix, mix") and the predicted brand is "BRAND Z" predicted brand score: 0.3422 As such, this may be a candidate for further review.

Aspects of the technical solution can be described by way of examples and with reference to FIGS. 1A and 1B. FIG. 1A is a block diagram of an exemplary technical solution environment, based on example environments described with reference to FIGS. 19-21 for use in implementing embodiments of the technical solution are shown. Generally the technical solution environment includes a technical solution system suitable for providing the example item listing system 100 in which methods of the present disclosure may be employed. In particular, FIG. 1A shows a high level architecture of the item listing system 100 in accordance with implementations of the present disclosure. Among other engines, managers, generators, selectors, or components not shown (collectively referred to herein as "components"), the item listing system 100 of FIG. 1A corresponds to FIG. 1B.

Example Methods

With reference to FIGS. 10-18 flow diagrams that illustrate methods providing brand-focused artificial intelligence management functionality in an item listing system. The methods may be performed using the item listing system described herein. In embodiments, one or more computer-storage media having computer-executable or computer-useable instructions embodied thereon that, when executed, by one or more processors can cause the one or more processors to perform the methods (e.g., computer implemented method) in an item listing platform system (e.g., computerized system or computer system).

Figure 10:
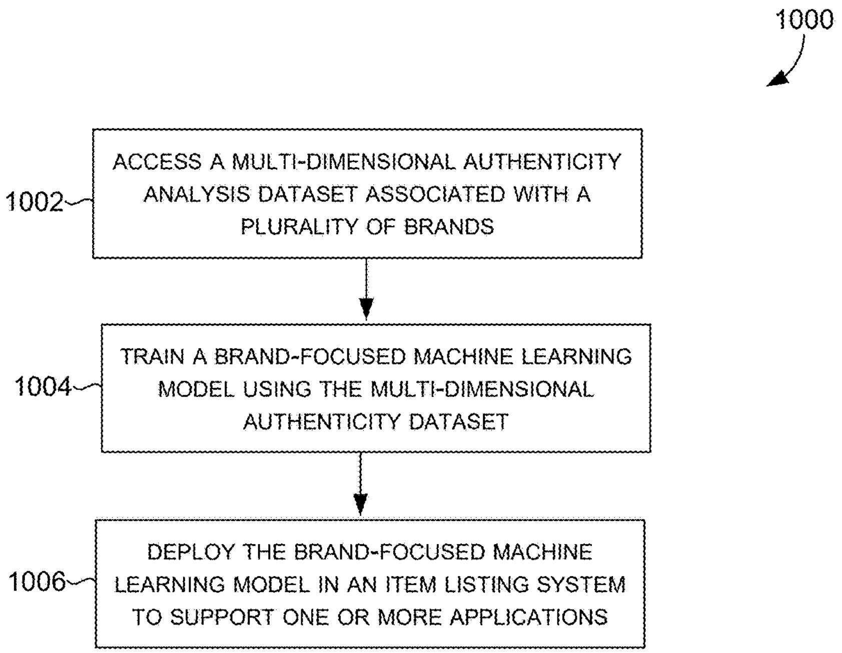
FIG. 10 provides a first exemplary method of providing brand-focused machine learning model training engine functionality in an item listing system, in accordance with aspects of the technology described herein.

Turning to FIG. 10, a flow diagram is provided that illustrates a method 1000 providing brand-focused artificial intelligence management functionality in an item listing system. At block 1002, access a multi-dimensional authenticity analysis dataset associated with a plurality of brands; at block 1004, train a brand-focused machine learning model using the multi-dimensional authenticity dataset; and at block 1006, deploy the brand-focused machine learning model in an item listing system to support one or more applications.

Figure 11:
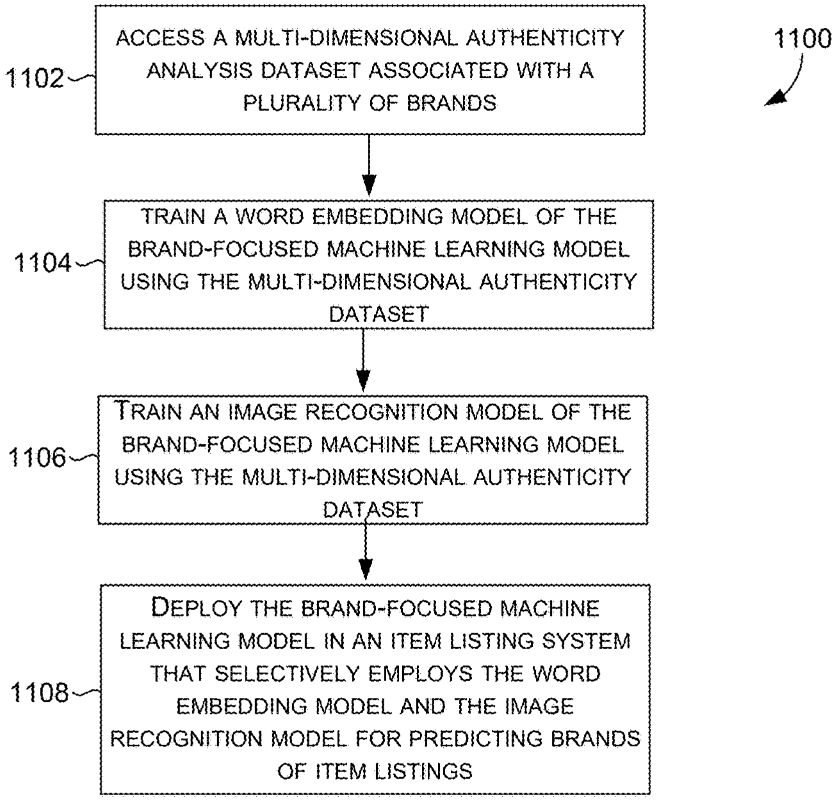
FIG. 11 provides a second exemplary method of providing brand-focused machine learning model training engine functionality in an item listing system, in accordance with aspects of the technology described herein.

Turning to FIG. 11, a flow diagram is provided that illustrates a method 1100 providing brand-focused artificial intelligence management functionality in an item listing system. At block 1102, access a multi-dimensional authenticity analysis dataset associated with a plurality of brands; at block 11104, train a word embedding model of the brand-focused machine learning model using the multi-dimensional authenticity dataset; at block 1106, train an image recognition model of the brand-focused machine learning model using the multi-dimensional authenticity dataset; and deploy the brand-focused machine learning model in an item listing system that selectively employed the word embedding model and the image recognition model for predicting brands of item listings.

Figure 12:
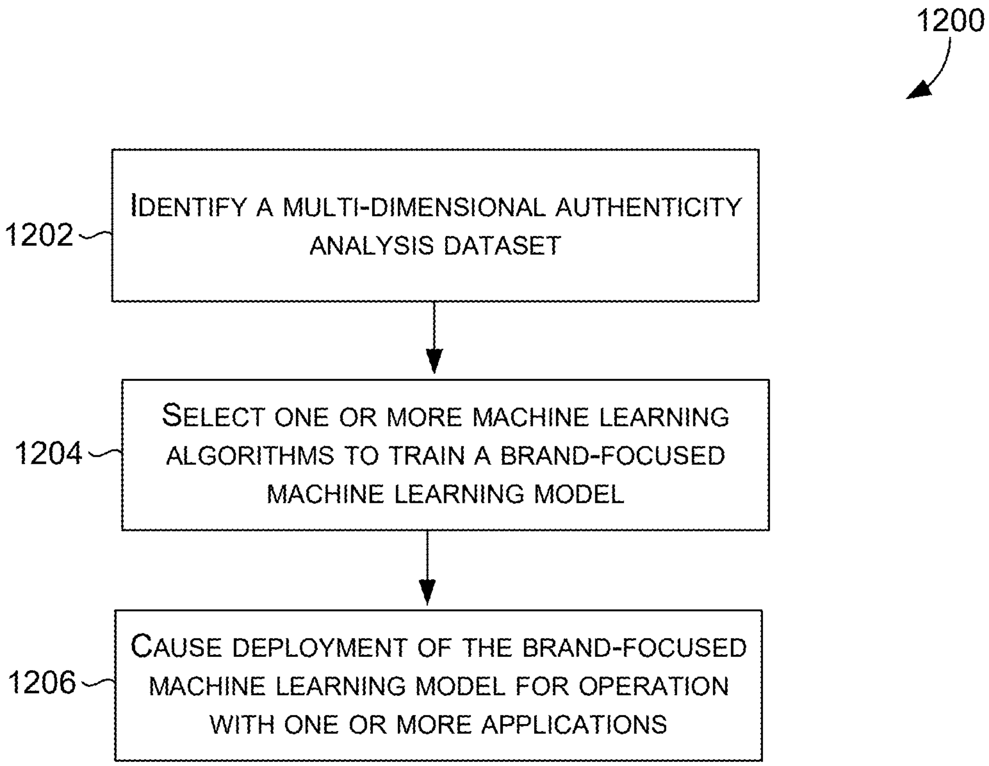
FIG. 12 provides a third exemplary method of providing brand-focused machine learning model training engine functionality in an item listing system, in accordance with aspects of the technology described herein.

Turning to FIG. 12, a flow diagram is provided that illustrates a method 1200 providing brand-focused artificial intelligence management functionality in an item listing system. At block 1202, identify a multi-dimensional authenticity analysis dataset; select one or more machine learning algorithms to train a brand-focused machine learning model; and cause deployment of the brand-focused machine learning for operation with one or more application of an item listing system.

Figure 13:
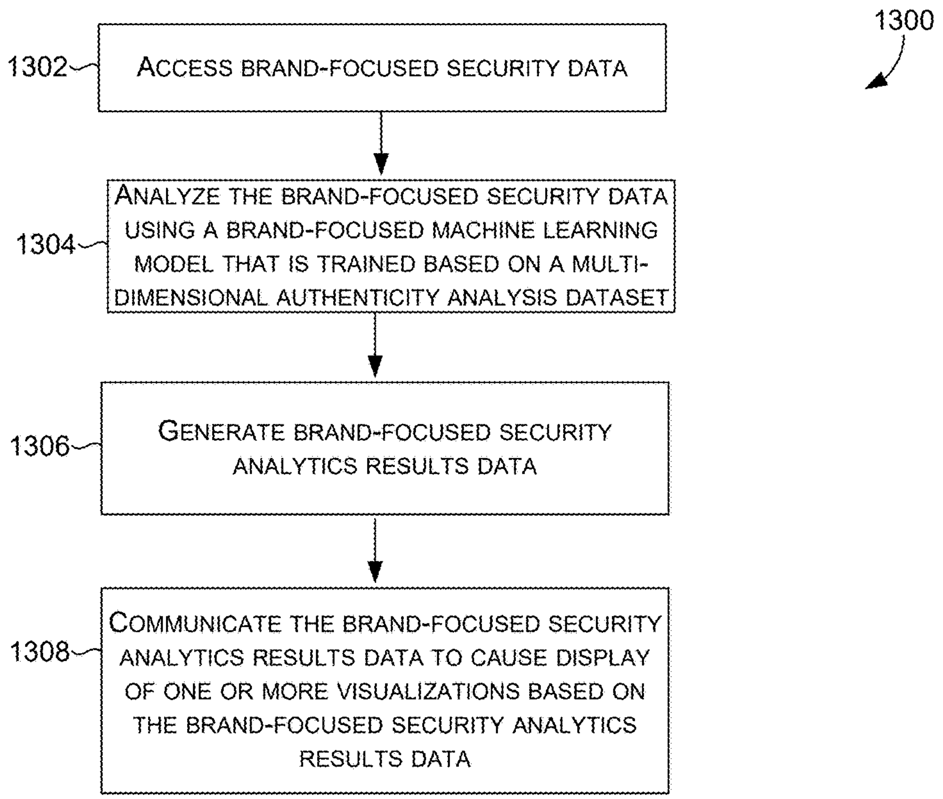
FIG. 13 provides a first exemplary method of providing brand-focused security administrator engine functionality in an item listing system, in accordance with aspects of the technology described herein.

Turning to FIG. 13, a flow diagram is provided that illustrates a method 1300 providing brand-focused artificial intelligence management functionality in an item listing system. At block 1302, access brand-focused security data; at block 1304, analyze the brand-focused security data using a brand-focused machine learning model that is trained based on multi-dimensional authenticity analysis dataset; at block 1306, generate brand-focused security analytics results data; and at block 1308, communicate the brand-focused security analytics results data to cause display of one or more visualizations based on the brand-focused security analytics results data.

Figure 14:
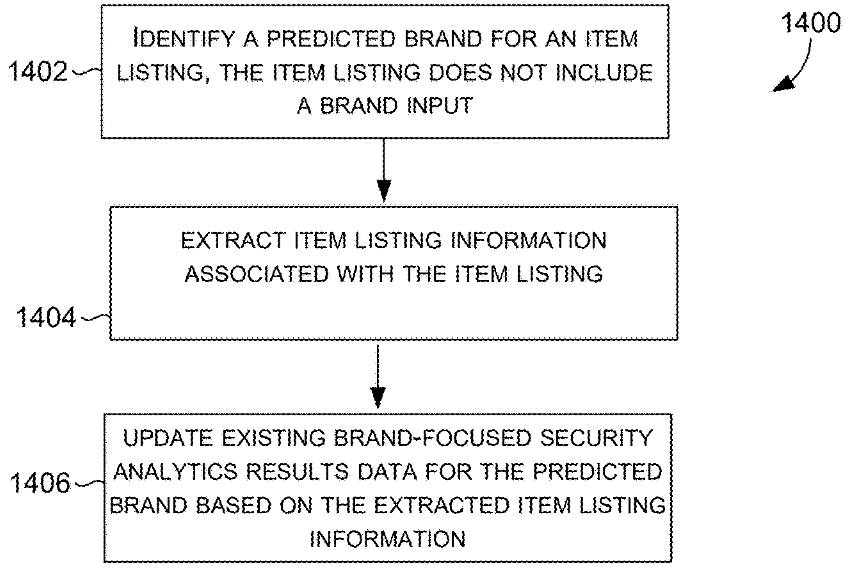
FIG. 14 provides a second exemplary method of providing brand-focused security administrator engine functionality in an item listing system, in accordance with aspects of the technology described herein.

Turning to FIG. 14, a flow diagram is provided that illustrates a method 1400 providing brand-focused artificial intelligence management functionality in an item listing system. At block 1402, identify a predicted brand for an item listing, the item listing does not include a brand input; at block 1404, extract item listing information associated with the item listing update; at block 1406, update existing brand-focused security analytics results data for the predicted brand based on the extracted item listing information.

Figure 15:
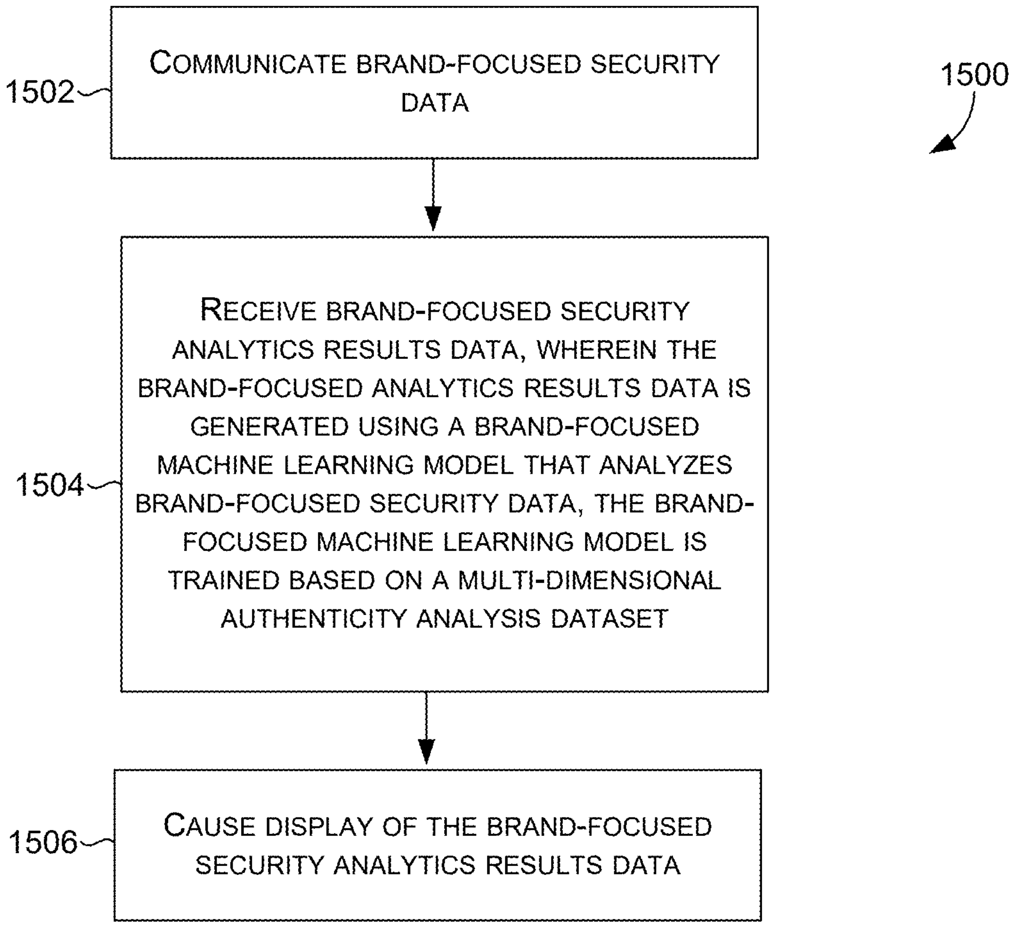
FIG. 15 provides a third exemplary method of providing brand-focused security administrator engine functionality in an item listing system, in accordance with aspects of the technology described herein.

Turning to FIG. 15, a flow diagram is provided that illustrates a method 1500 providing brand-focused artificial intelligence management functionality in an item listing system. At block 1502, communicate brand-focused security data; at block 1504, receive brand-focused security analytics data, the brand-focused analytics results data is generated using a brand-focused machine learning model that analyzes brand-focused security data. The brand-focused machine learning model is trained based on a multi-dimensional authenticity analysis data; at block 1506, cause display of the brand-focused security analytics results data.

Figure 16:
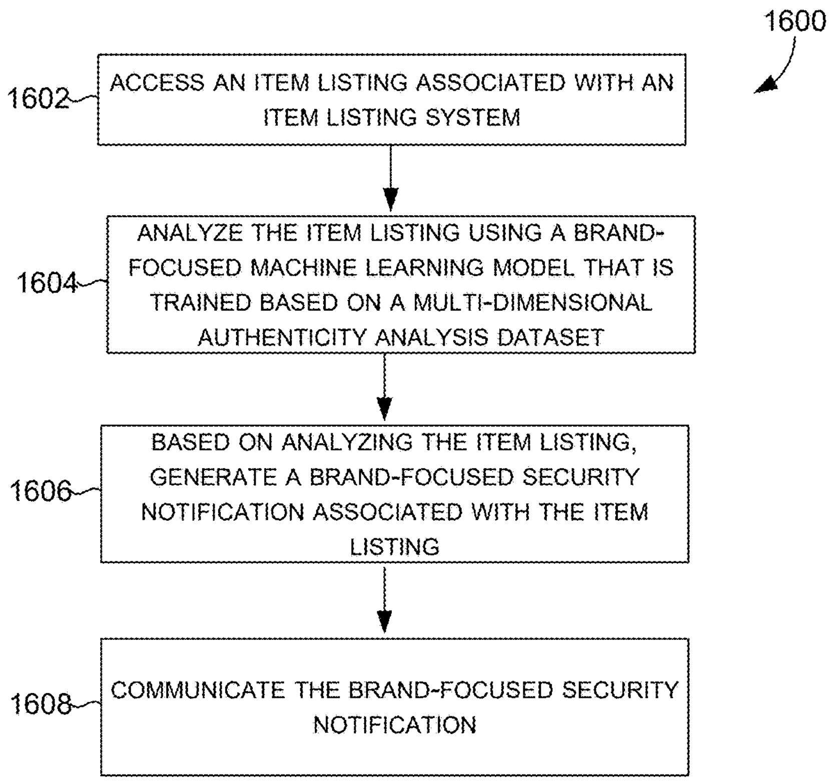
FIG. 16 provides a first exemplary method of providing brand-focused listing management engine functionality in an item listing system, in accordance with aspects of the technology described herein.

Turning to FIG. 16, a flow diagram is provided that illustrates a method 1600 providing brand-focused artificial intelligence management functionality in an item listing system. At block 1602, access an item listing associated with an item listing system; at block 1604, analyze the item listing using a brand-focused machine learning model that is trained based on a multi-dimensional authenticity analysis dataset; at block 1606, based on analyzing the item listing, generate a brand-focused security notification associated with the item listing; and at block 1608, communicate the brand-focused security notification.

Figure 17:
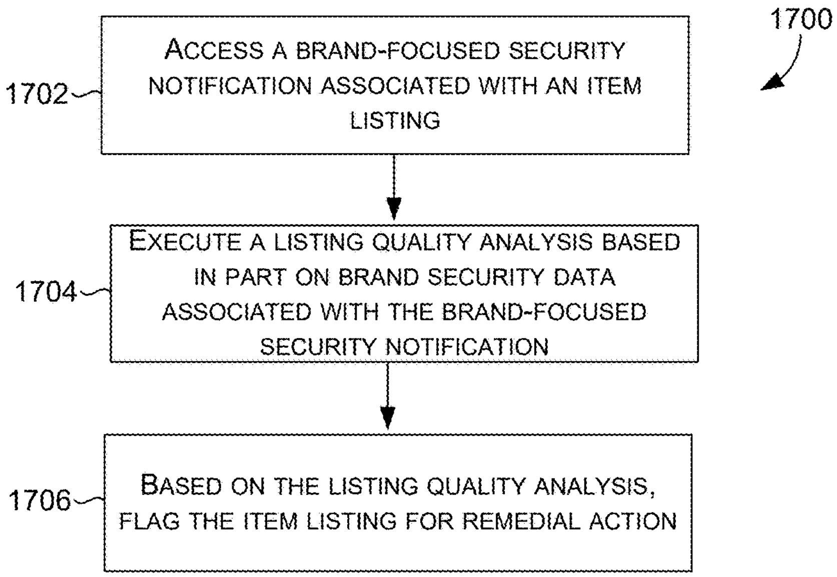
FIG. 17 provides a second exemplary method of providing brand-focused listing management engine functionality in an item listing system, in accordance with aspects of the technology described herein.

Turning to FIG. 17, a flow diagram is provided that illustrates a method 1700 providing brand-focused artificial intelligence management functionality in an item listing system. At block 1702, access brand-focused security notification associated with an item listing; block 1704, execute a listing quality analysis based in part on brand security data associated with the brand-focused security notification; and at block 1706, based on the item listing quality analysis, flag the item listing for remedial action.

Figure 18:
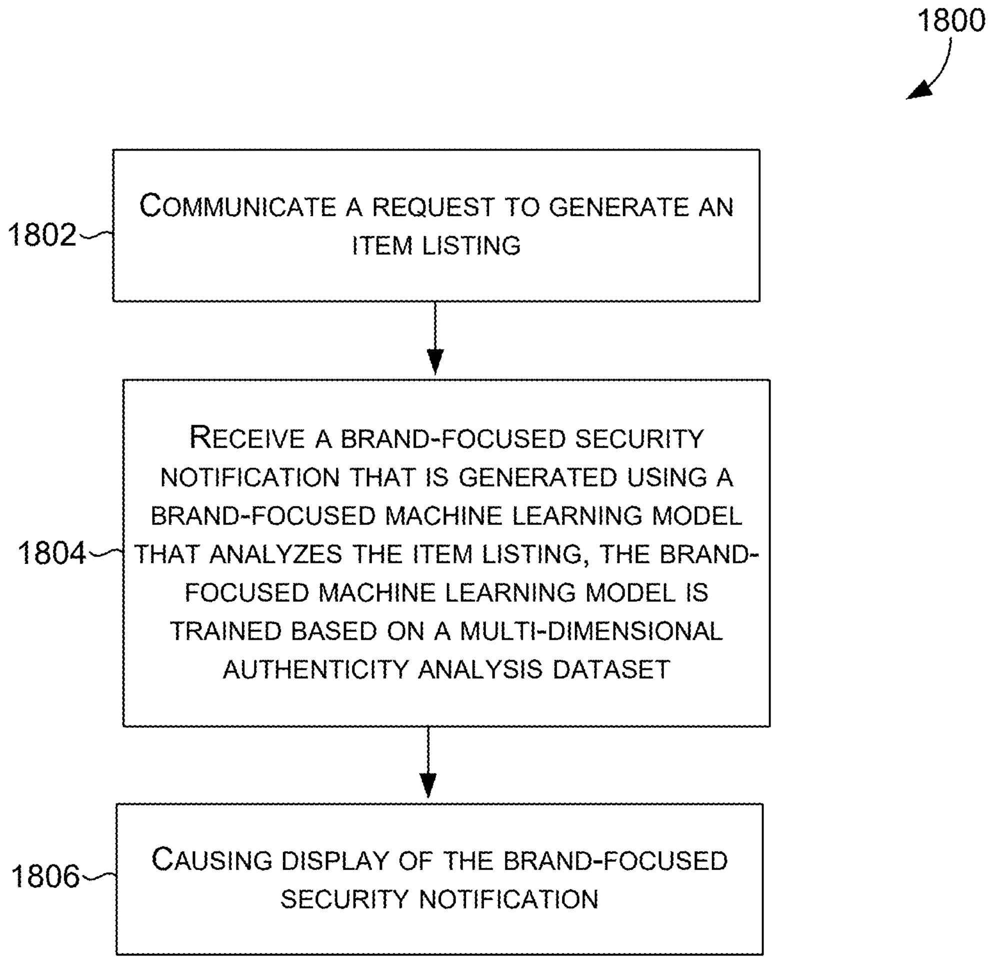
FIG. 18 provides a third exemplary method of providing brand-focused listing management engine functionality in an item listing system, in accordance with aspects of the technology described herein.
Figure 19:
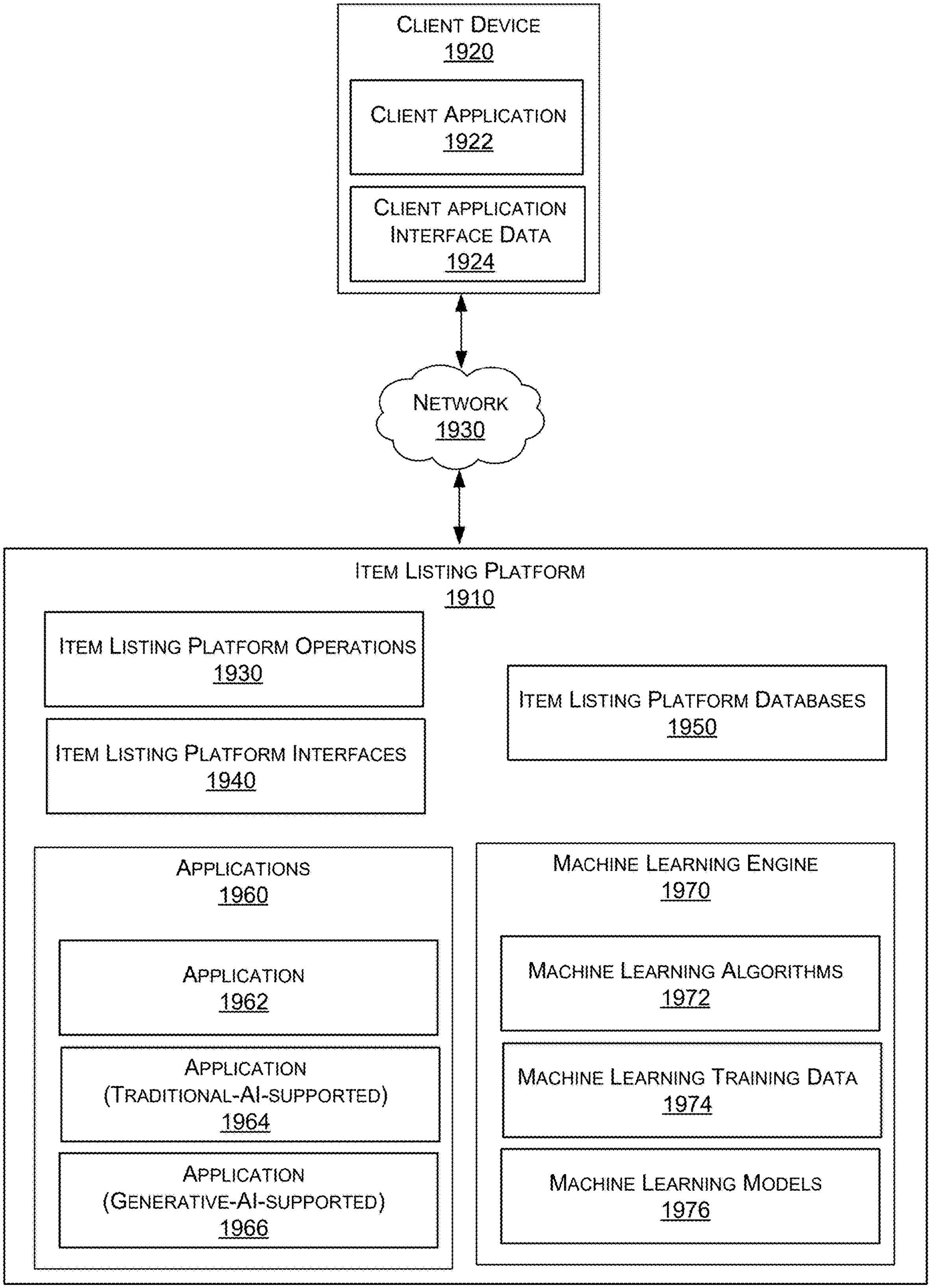
FIG. 19 provides a block diagram of an exemplary item listing system computing environment suitable for use in implementing aspects of the technology described herein.

Turning to FIG. 18, a flow diagram is provided that illustrates a method 1800 providing brand-focused artificial intelligence management functionality in an item listing system. At block 1802, communicate a request to generate an item listing; at block 1804, receive a brand-focused security notification that is generated using a brand-focused machine learning model that analyzes the item listing. The brand-focused machine learning model is trained based on a multi-dimensional authenticity analysis dataset; at block 1806, cause display of the brand-focused security notification Additional Support for Detailed Description of the Invention Example Item Listing System Environment Referring now to FIG. 19, FIG. 19 illustrates an example item listing system 1900 computing environment in which implementations of the present disclosure may be employed. In particular, FIG. 19 shows a high level architecture of an example item listing platform 1910 that can host a technical solution environment, or a portion thereof. It should be understood that this and other arrangements described herein are set forth as examples. For example, as described above, many elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

The item listing system 1900 can be a cloud computing environment that provides computing resources for functionality associated with the item listing platform 1910. For example, the item listing system 1900 supports delivery of computing components and services-including servers, storage, databases, networking, applications, and machine learning associated with the item listing platform 1910 and client device 1920. A plurality of client devices (e.g., client device 1920) include hardware or software that access resources on the item listing system 1900. Client device 1920 can include an application (e.g., client application 1922) and interface data (e.g., client application interface data 1924) that support client-side functionality associated with the item listing system. The plurality of client devices can access computing components of the item listing system 1900 via a network (e.g., network 1930) to perform computing operations.

The item listing platform 1910 is responsible for providing a computing environment or architecture that includes the infrastructure that supports providing item listing platform functionality (e.g., e-commerce functionality). The item listing platform support storing item in item databases and providing a search system for receiving queries and identifying search results based on the queries. The item listing platform may also provide a computing environment with features for managing, selling, buying, and recommending different types of items. Item listing platform 1910 can specifically be for a content platform such as EBAY content platform or e-commerce platform, developed by EBAY INC., of San Jose, California.

The item listing platform 1910 can provide item listing operations 1930 and item listing interfaces 1940. The item listing operations 1930 can include service operations, communication operations, resource management operations, security operations, and fault tolerance operations that support specific tasks or functions in the item listing platform 1910. The item listing interfaces 1940 can include service interfaces, communication interfaces, resource interfaces, security interfaces, and management and monitoring interfaces that support functionality between the item listing platform components. The item listing operations 1930 and item listing interfaces 1940 can enable communication, coordination and seamless functioning of the item listing system 1900.

By way of example, functionality associated with item listing platform 1910 can include shopping operations (e.g., product search and browsing, product selection and shopping cart, checkout and payment, and order tracking); user account operations (e.g., user registration and authentication, and user profiles); seller and product management operations (e.g., seller registration and product listing and inventory management); payment and financial operations (e.g., payment processing, refunds and returns); order fulfillment operations (e.g., order processing and fulfillment and inventory management); customer support and communication interfaces (e.g., customer support chat/email and notifications); security and privacy interfaces (e.g., authentication and authorization, payment security); recommendation and personalization interfaces (e.g., product recommendations and customer reviews and ratings); analytics and report interfaces (e.g., sales and inventory reports, and user behavior analytics); and APIs and Integration Interfaces (e.g., APIs for Third-Party Integration).

The item listing platform 1910 can provide item listing platform databases (e.g., item listing platform databases 1950) to manage and store different types of data efficiently. The item listing platform databases 1950 can include relational databases, NoSQL databases, search databases, cache databases, content management systems, analytics databases, payment gateway database, customer relationship management databases, log and error databases, inventory and supply chain databases, and multi-channel databases that are used in combination to efficiently manage data and provide e-commerce experience for users.

The item listing platform 1910 supports applications (e.g., applications 1960) that is a computer program or software component or service that serves a specific function or set of functions to fulfil a particular item listing platform requirement or user requirement. Applications can be client-side (user-facing) and server-side (backend). Applications can also include application without any AI support (e.g., application 1962) application supported by traditional AI model (e.g., application 1964), and applications supported by generative AI models (e.g., application 1966). By way of example, applications can include an online storefront application, mobile shopping app, admin and management console, payment gateway integration, user account and authentication application, search and recommendation engines, inventory and stock management application, order processing and fulfillment application, customer support and communication tools, content management system, analytics and report applications, marketing and promotion applications, multi-channel integration applications, log and error tracking applications, customer relationship management (CRM) applications, security applications, and APIs and web services that are used in combination to efficiently deliver e-commerce experiences for users.

The items listing platform 1910 can include a machine learning engine (e.g., machine learning engine 1970). The machine learning engine 1970 refers to machine learning framework or machine learning platform that provides the infrastructure and tools to design, train, evaluate, and deploy machine learning models. The machine learning engine 1970 can serve as the backbone for developing and deploying machine learning applications and solutions. Machine learning engine 1970 can also provide tools for visualizing data and model results, as well as interpreting model decisions to gain insights into how the model is making predictions.

The machine learning engine 1970 can provide the necessary libraries, algorithms, and utilities to perform various tasks within the machine learning workflow. The machine learning workflow can include data processing, model selection, model training, model evaluation, hyperparameter tuning, scalability, model deployment, inference, integration, customization, data visualization. Machine learning engine 1970 can include pre-trained models for various tasks, simplifying the development process. In this way, the machine learning engine 1970 can streamline the entire machine learning process, from data preparation and model training to deployment and inference, making it accessible and efficient for different types of users (e.g., customers, data scientists, machine learning engineers, and developers) working on a wide range of machine learning applications.

Machine learning engine 1970 can be implemented in the item listing system 1900 as a component that leverages machine learning algorithms and techniques (e.g., machine learning algorithms 1972) to enhance various aspects of the item listing system's functionality. Machine learning engine 1970 can provide a selection of machine learning algorithms and techniques used to teach computers to learn from data and make predictions or decisions without being explicitly programmed. These techniques are widely used in various applications across different industries, and can include the following examples: supervised learning (e.g., linear regression: classification, support vector machines (SVM); unsupervised learning (e.g., clustering, principal component analysis (PCA), association rules (e.g., apriori); reinforcement learning (e.g., Q-Learning, deep Q-Network (DQN); and deep learning (e.g., neural networks, convolutional neural networks (CNN), and recurrent neural networks (RNN); and ensemble learning random forest.

Machine learning training data 120 supports the process of building, training, and fine-tuning machine learning models. Machine learning training data 120 consists of a labeled dataset that is used to teach a machine learning model to recognize patterns, make predictions, or perform specific tasks. Training data typically comprises two main components: input feature (X) and labels or target values (Y). Input features can include variables, attributes, or characteristics used as input to the machine learning model. Input features (X) can be numeric, categorical, or even textual, depending on the nature of the problem. For example, in a model for predicting house prices, input features might include the number of bedrooms, square footage, neighborhood, and so on. Labels or target values (Y) include the values that the model aims to predict or classify. Labels represent the desired output or the ground truth for each corresponding set of input features. For instance, in a spam email classifier, the labels would indicate whether each email is spam or not (i.e., binary classification). The training process involves presenting the model with the training data, and the model learns to make predictions or decisions by identifying patterns and relationships between the input features (X) and the target values (Y). A machine learning algorithm adjusts its internal parameters during training in order to minimize the difference between its predictions and the actual labels in the training data. Machine learning engine 1970 can use historical and real-time data to train models and make predictions, continually improving performance and user experience.

Machine learning engine 1970 can include machine learning models (e.g., machine learning models 1976) generated using the machine learning engine workflow. Machine learning models 1976 can include generative AI models and traditional AI models that can both be employed in the item listing system 1900. Generative AI models are designed to generate new data, often in the form of text, images, or other media, based on patterns and knowledge learned from existing data. Generative AI models can be employed in various ways including: content generation, product image generation, personalized product recommendations, natural language chatbots, and content summarization. Traditional AI models encompass a wide range of algorithms and techniques and can be employed in various ways including: recommendation systems, predictive analytics, search algorithms, fraud detection, customer segmentation, image classification, Natural Language Processing (NLP) and A/B testing and optimization. In many cases, a combination of both generative and traditional AI models can be employed to provide a well-rounded and effective e-commerce experience, combining data-driven insights and creativity.

Machine learning engine 1970 can be used to analyze data, make predictions, and automate processes to provide a more personalized and efficient shopping experience for users. By way of example, product recommendations search and filtering: pricing optimization, inventory and stock management: customer segmentation, churn prediction and retention, fraud detection, sentiment analysis, customer support and chatbots, image and video analysis, and ad targeting and marketing. The specific applications of machine learning within the item listing platform 1910 can vary depending on the specific goals, available data, and resources.

Example Distributed Computing System Environment

Figure 20:
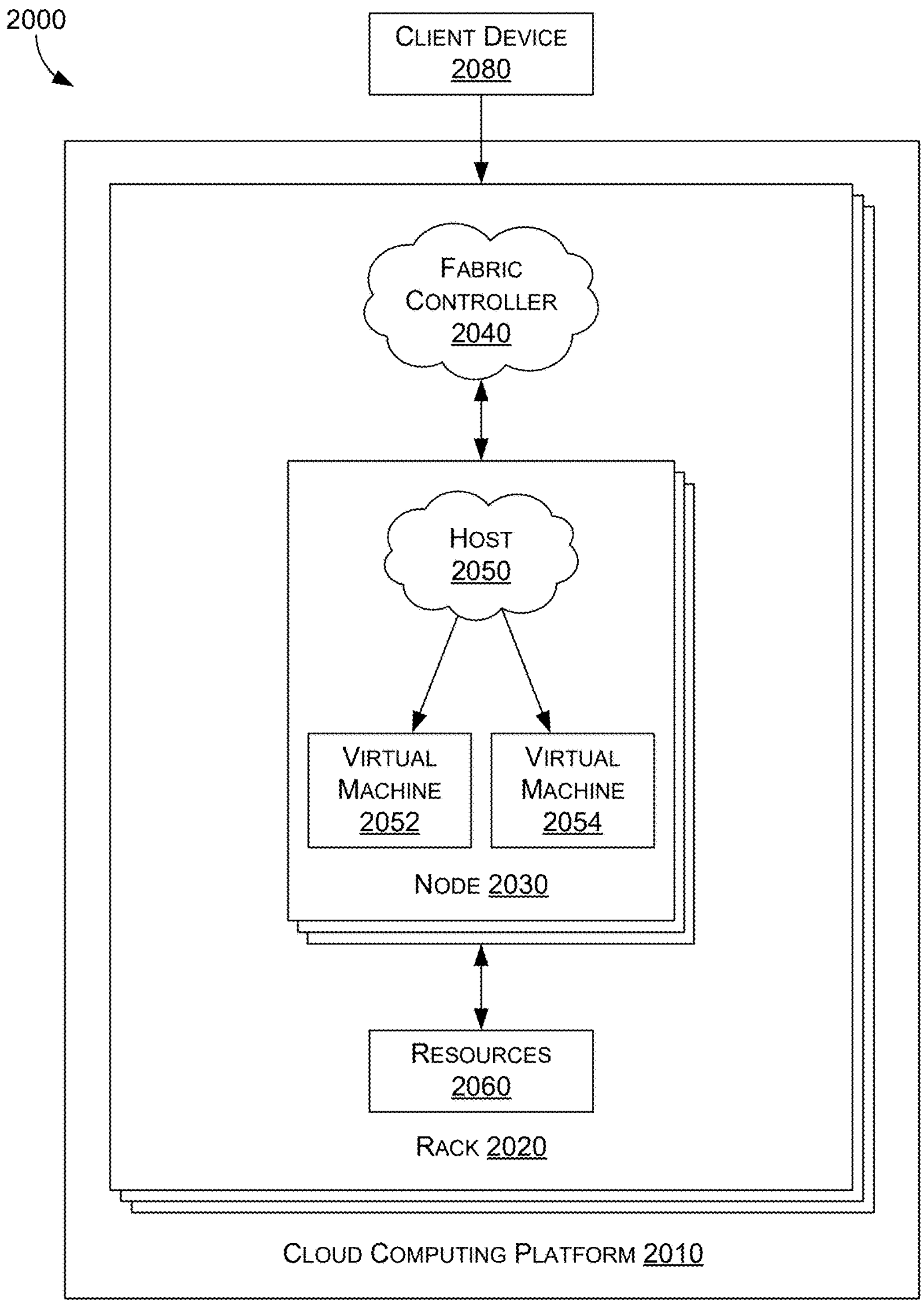
FIG. 20 provides a block diagram of an exemplary distributed computing environment suitable for use in implementing aspects of the technology described herein.

Referring now to FIG. 20, FIG. 20 illustrates an example distributed computing environment 2000 in which implementations of the present disclosure may be employed. In particular, FIG. 20 shows a high level architecture of an example cloud computing platform 2010 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 2000 that includes cloud computing platform 2010, rack 2020, and node 2030 (e.g., computing devices, processing units, or blades) in rack 2020. The technical solution environment can be implemented with cloud computing platform 2010 that runs cloud services across different data centers and geographic regions. Cloud computing platform 2010 can implement fabric controller 2040 component for provisioning and managing resource allocation, deployment, upgrade, and management of cloud services. Typically, cloud computing platform 2010 acts to store data or run service applications in a distributed manner. Cloud computing infrastructure 2010 in a data center can be configured to host and support operation of endpoints of a particular service application. Cloud computing infrastructure 2010 may be a public cloud, a private cloud, or a dedicated cloud.

Node 2030 can be provisioned with host 2050 (e.g., operating system or runtime environment) running a defined software stack on node 2030. Node 2030 can also be configured to perform specialized functionality (e.g., compute nodes or storage nodes) within cloud computing platform 2010. Node 2030 is allocated to run one or more portions of a service application of a tenant. A tenant can refer to a customer utilizing resources of cloud computing platform 2010. Service application components of cloud computing platform 2010 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 2030, nodes 2030 may be partitioned into virtual machines (e.g., virtual machine 2052 and virtual machine 2054). Physical machines can also concurrently run separate service applications. The virtual machines or physical machines can be configured as individualized computing environments that are supported by resources 2060 (e.g., hardware resources and software resources) in cloud computing platform 2010. It is contemplated that resources can be configured for specific service applications. Further, each service application may be divided into functional portions such that each functional portion is able to run on a separate virtual machine. In cloud computing platform 2010, multiple servers may be used to run service applications and perform data storage operations in a cluster. In particular, the servers may perform data operations independently but exposed as a single device referred to as a cluster. Each server in the cluster can be implemented as a node.

Client device 2080 may be linked to a service application in cloud computing platform 2010. Client device 2080 may be any type of computing device, which may correspond to computing device 2000 described with reference to FIG. 20, for example, client device 2080 can be configured to issue commands to cloud computing platform 2010. In embodiments, client device 2080 may communicate with service applications through a virtual Internet Protocol (IP) and load balancer or other means that direct communication requests to designated endpoints in cloud computing platform 2010. The components of cloud computing platform 2010 may communicate with each other over a network (not shown), which may include, without limitation, one or more local area networks (LANs) and/or wide area networks (WANs).

Example Computing Environment

Figure 21:
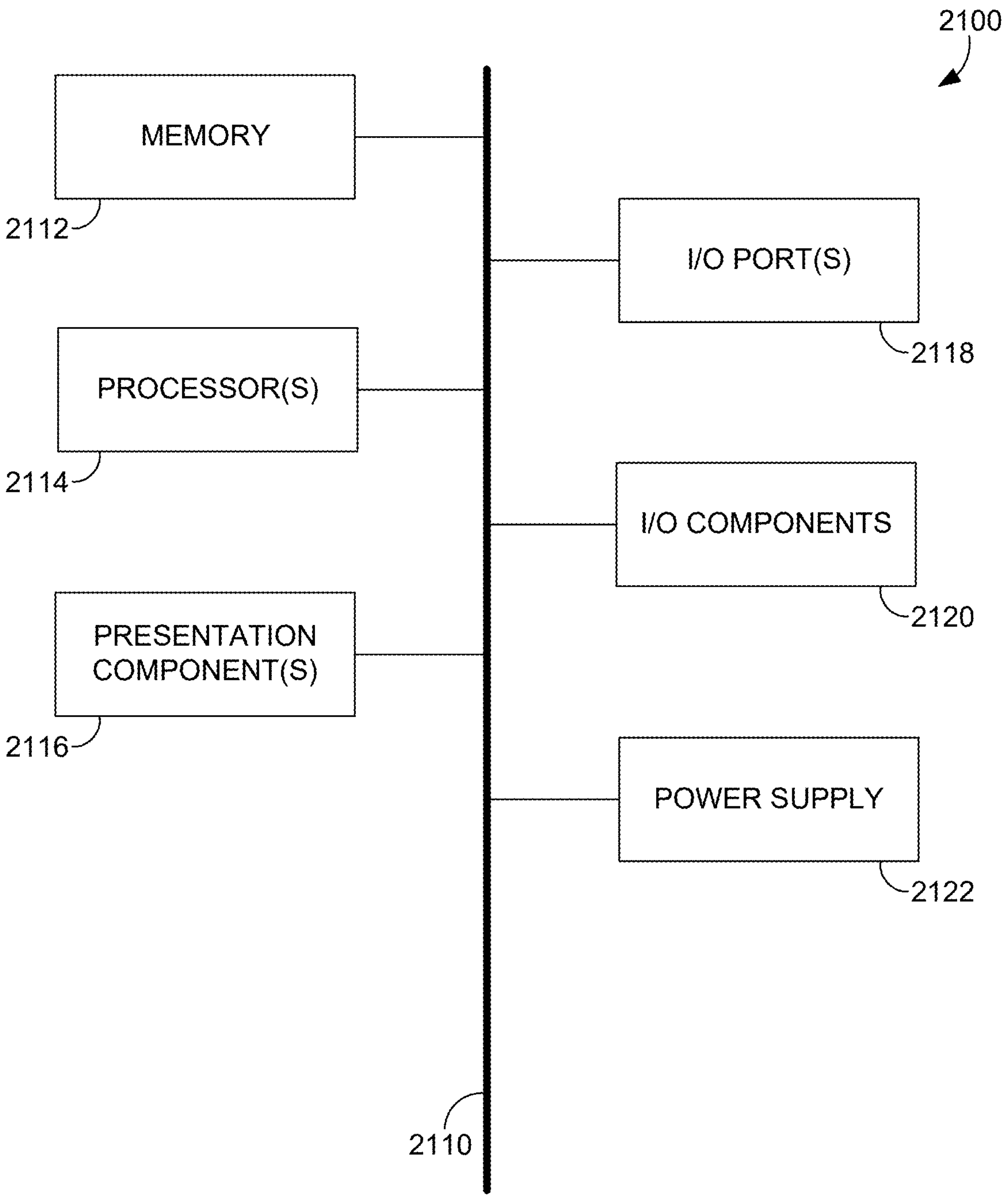
FIG. 21 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 21 in particular, an example operating environment for implementing embodiments of the present invention is shown and designated generally as computing device 2100. Computing device 2100 is but one example of a suitable computing environment and is not intended to suggest any limitation as to the scope of use or functionality of the invention. Neither should computing device 2100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 21, computing device 2100 includes bus 2110 that directly or indirectly couples the following devices: memory 2112, one or more processors 2114, one or more presentation components 2116, input/output ports 2118, input/output components 2120, and illustrative power supply 2122. Bus 2110 represents what may be one or more buses (such as an address bus, data bus, or combination thereof). The various blocks of FIG. 21 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 21 is merely illustrative of an example computing device that can be used in connection with one or more embodiments of the present invention. Distinction is not made between such categories as "workstation," "server," "laptop," "hand-held device," etc., as all are contemplated within the scope of FIG. 21 and reference to "computing device."

Computing device 2100 typically includes a variety of computer-readable media. Computer-readable media can be any available media that can be accessed by computing device 2100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 2100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 2112 includes computer storage media in the form of volatile and/or nonvolatile memory. The memory may be removable, non-removable, or a combination thereof. Exemplary hardware devices include solid-state memory, hard drives, optical-disc drives, etc. Computing device 2100 includes one or more processors that read data from various entities such as memory 2112 or I/O components 2120. Presentation component(s) 2116 present data indications to a user or other device. Exemplary presentation components include a display device, speaker, printing component, vibrating component, etc.

I/O ports 2118 allow computing device 2100 to be logically coupled to other devices including I/O components 2120, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:

one or more computer processors; and computer memory storing computer-useable instructions that, when used by the one or more computer processors, cause the one or more computer processors to perform operations, the operations comprising:

accessing brand-focused security data;

analyzing the brand-focused security data using a brand-focused machine learning model that is trained based on a multi-dimensional authenticity analysis dataset and brand multi-dimensional authenticity features, wherein the multi-dimensional authenticity analysis dataset is generated from multiple authenticity-verified domains comprising rights-owner-provided brand-verification data, post-sale item-authentication records, and item listing system data to provide ground-truth inputs for training the brand-focused machine learning model, wherein the rights-owner-provided brand-verification data comprises verified brand information, trademark information, or rights ownership information used to provide ground-truth labels or annotations for model training;

wherein the post-sale item-authentication records comprise physical inspection information, authentication certificate information, or historical sales data associated with completed transactions;

wherein the brand multi-dimensional authenticity features comprise heterogeneous data attributes representing brand authenticity across multiple modalities, the heterogeneous data attributes are embedded through feature-fusion during model training to represent authentic characteristics of a brand, wherein the brand multi-dimensional authenticity features from different sources are combined into a single feature vector during feature fusion, the single feature vector representing multi-dimensional authenticity features of the brand;

based on analyzing the brand-focused security data using the brand-focused machine learning model, generating brand-focused security analytics results data, wherein the brand-focused security analytics result data is associated with the single feature vector to indicate brand-authenticity confidence for a predicted brand; and communicating the brand-focused security analytics results data to cause display of one or more visualizations based on the brand-focused security analytics results data.

2. The system of claim 1, wherein the brand-focused machine learning model is integrated into a brand-focused security administrator tool of an item listing system to support generating the brand-focused security analytics results data.

3. The system of claim 1, wherein the multi-dimensional authenticity analysis dataset comprises intellectual property rights enforcement data, authenticated memorabilia data, and the item listing system data that provide ground truth labeling and annotations associated with model training.

4. The system of claim 1, wherein training the brand-focused machine learning model is based on machine learning techniques that fuse the brand multi-dimensional authenticity features that correspond to intellectual property rights enforcement data, authenticated memorabilia data, and the item listing system data.

5. The system of claim 1, wherein generating the brand-focused security analytics results data is based on:

identifying the predicted brand for an item listing, wherein the item listing does not include a brand input;

extracting item listing information associated with the item listing; and updating existing brand-focused security analytics results data for the predicted brand based on the extracted item listing information.

6. The system of claim 1, wherein the accessing of the brand-focused security data is based on a request from a security administrator for brand-focused security analytics results data associated with a brand identifier in the request.

7. The system of claim 1, the operations further comprising generating a brand security strategy based on the brand-focused security analytics results data.

8. One or more computer-storage media having computer-executable instructions embodied thereon that, when executed by a computing system having a processor and memory, cause the processor to perform operations, the operations comprising:

accessing brand-focused security data;

analyzing the brand-focused security data using a brand-focused machine learning model that is trained based on a multi-dimensional authenticity analysis dataset and brand multi-dimensional authenticity features, wherein the multi-dimensional authenticity analysis dataset is generated from multiple authenticity-verified domains comprising rights-owner-provided brand-verification data, post-sale item-authentication records, and item listing system data to provide ground-truth inputs for training the brand-focused machine learning model, wherein the rights-owner-provided brand-verification data comprises verified brand information, trademark information, or rights ownership information used to provide ground-truth labels or annotations for model training;

wherein the post-sale item-authentication records comprise physical inspection information, authentication certificate information, or historical sales data associated with completed transactions;

wherein the brand multi-dimensional authenticity features comprise heterogeneous data attributes representing brand authenticity across multiple modalities, the heterogeneous data attributes are embedded through feature-fusion during model training to represent authentic characteristics of a brand, wherein the brand multi-dimensional authenticity features from different sources are combined into a single feature vector during feature fusion, the single feature vector representing multi-dimensional authenticity features of the brand;

based on analyzing the brand-focused security data using the brand-focused machine learning model, generating brand-focused security analytics results data, wherein the brand-focused security analytics result data is associated with the single feature vector to indicate brand-authenticity confidence for a predicted brand; and communicating the brand-focused security analytics results data to cause display of one or more visualizations based on the brand-focused security analytics results data.

9. The media of claim 8, wherein the brand-focused machine learning model is integrated into a brand-focused security administrator tool of an item listing system to support generating the brand-focused security analytics results data.

10. The media of claim 8, wherein the multi-dimensional authenticity analysis dataset comprises intellectual property rights enforcement data, authenticated memorabilia data, and the item listing system data that provide ground truth labeling and annotations associated with model training.

11. The media of claim 8, wherein training the brand-focused machine learning model is based on machine learning techniques that fuse the brand multi-dimensional authenticity features that correspond to intellectual property rights enforcement data, authenticated memorabilia data, and the item listing system data.

12. The media of claim 8, wherein generating the brand-focused security analytics results data is based on:

identifying the predicted brand for an item listing, wherein the item listing does not include a brand input;

extracting item listing information associated with the item listing; and updating existing brand-focused security analytics results data for the predicted brand based on the extracted item listing information.

13. The media of claim 8, wherein the accessing of the brand-focused security data is based on a request from a security administrator for brand-focused security analytics results data associated with a brand identifier in the request.

14. The media of claim 8, the operations further comprising generating a brand security strategy based on the brand-focused security analytics results data.

15. A computer-implemented method, the method comprising:

accessing brand-focused security data;

analyzing the brand-focused security data using a brand-focused machine learning model that is trained based on a multi-dimensional authenticity analysis dataset and brand multi-dimensional authenticity features, wherein the multi-dimensional authenticity analysis dataset is generated from multiple authenticity-verified domains comprising rights-owner-provided brand-verification data, post-sale item-authentication records, and item listing system data to provide ground-truth inputs for training the brand-focused machine learning model, wherein the rights-owner-provided brand-verification data comprises verified brand information, trademark information, or rights ownership information used to provide ground-truth labels or annotations for model training;

wherein the post-sale item-authentication records comprise physical inspection information, authentication certificate information, or historical sales data associated with completed transactions;

wherein the brand multi-dimensional authenticity features comprise heterogeneous data attributes representing brand authenticity across multiple modalities, the heterogeneous data attributes are embedded through feature-fusion during model training to represent authentic characteristics of a brand, wherein the brand multi-dimensional authenticity features from different sources are combined into a single feature vector during feature fusion, the single feature vector representing multi-dimensional authenticity features of the brand;

based on analyzing the brand-focused security data using the brand-focused machine learning model, generating brand-focused security analytics results data, wherein the brand-focused security analytics result data is associated with the single feature vector to indicate brand-authenticity confidence for a predicted brand; and communicating the brand-focused security analytics results data to cause display of one or more visualizations based on the brand-focused security analytics results data.

16. The method of claim 15, wherein the brand-focused machine learning model is integrated into a brand-focused security administrator tool of an item listing system to support generating the brand-focused security analytics results data.

17. The method of claim 15, wherein training the brand-focused machine learning model is based on machine learning techniques that fuse the brand multi-dimensional authenticity features that correspond to intellectual property rights enforcement data, authenticated memorabilia data, and the item listing system data.

18. The method of claim 15, wherein training the brand-focused machine learning model is based on machine learning techniques that fuse the brand multi-dimensional authenticity features that correspond to intellectual property rights enforcement data, authenticated memorabilia data, and the item listing system data.

19. The method of claim 15, wherein generating the brand-focused security analytics results data is based on:

identifying the predicted brand for an item listing, wherein the item listing does not include a brand input;

extracting item listing information associated with the item listing; and updating existing brand-focused security analytics results data for the predicted brand based on the extracted item listing information.

20. The method of claim 15, wherein the accessing of the brand-focused security data is based on a request from a security administrator for brand-focused security analytics results data associated with a brand identifier in the request.

* * * * *